(12) United States Patent
Kirihara

(10) Patent No.: US 11,237,794 B2
(45) Date of Patent: Feb. 1, 2022

(54) INFORMATION PROCESSING DEVICE AND INFORMATION PROCESSING METHOD

(71) Applicant: SONY CORPORATION, Tokyo (JP)

(72) Inventor: Reiko Kirihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,939

(22) PCT Filed: Dec. 13, 2016

(86) PCT No.: PCT/JP2016/087096
§ 371 (c)(1),
(2) Date: Jul. 30, 2018

(87) PCT Pub. No.: WO2017/141530
PCT Pub. Date: Aug. 24, 2017

(65) Prior Publication Data
US 2019/0042188 A1 Feb. 7, 2019

(30) Foreign Application Priority Data

Feb. 18, 2016 (JP) .............................. JP2016-028899

(51) Int. Cl.
G06F 3/16 (2006.01)
G10L 15/07 (2013.01)
(Continued)

(52) U.S. Cl.
CPC ............. G06F 3/167 (2013.01); G10L 15/07 (2013.01); G10L 15/10 (2013.01); G10L 15/22 (2013.01); G10L 15/28 (2013.01); G10L 17/22 (2013.01); G10L 25/78 (2013.01); G10L 2015/226 (2013.01)

(58) Field of Classification Search
CPC ...................................................... G06F 3/167
See application file for complete search history.

(56) References Cited

U.S. PATENT DOCUMENTS

2007/0150106 A1 6/2007 Hashimoto et al.
2007/0150108 A1 6/2007 Yokoyama et al.
(Continued)

FOREIGN PATENT DOCUMENTS

CN 104488025 A 4/2015
CN 106030700 A 10/2016
(Continued)

OTHER PUBLICATIONS

Tamio Kihara, Yokoyama Masanori, Watanabe Hiroshi; A Composition Method of Situation Conformity Digital-signage Using Human Position and Movement; Feb. 12, 2012 Cited In the IDS dated Oct. 29, 2018; the NLP with english translation provided Oct. 29, 2018 (also attached here) (Year: 2012).*

(Continued)

Primary Examiner — Richa Mishra
(74) Attorney, Agent, or Firm — Chip Law Group

(57) ABSTRACT

An information processing device and information processing method capable of outputting an action based on an intention of the user. The information processing device including an action deciding unit that determines an action for a user on a basis of a distance from the user and an output control unit that outputs the action.

15 Claims, 17 Drawing Sheets

(51) Int. Cl.
*G10L 15/10* (2006.01)
*G10L 15/22* (2006.01)
*G10L 15/28* (2013.01)
*G10L 17/22* (2013.01)
*G10L 25/78* (2013.01)

(56) References Cited

U.S. PATENT DOCUMENTS

| | | | |
|---|---|---|---|
| 2010/0161409 A1* | 6/2010 | Ryu | G06Q 30/0254 705/14.43 |
| 2010/0277579 A1* | 11/2010 | Cho | G10L 15/24 348/61 |
| 2014/0204019 A1* | 7/2014 | Kihara | G06F 1/325 345/156 |
| 2015/0046157 A1 | 2/2015 | Wolff et al. | |
| 2015/0169336 A1* | 6/2015 | Harper | G10L 15/22 715/706 |
| 2015/0245312 A1* | 8/2015 | Ur | H04M 19/04 455/418 |
| 2016/0219144 A1 | 7/2016 | Ur | |
| 2016/0351191 A1 | 12/2016 | Vilermo et al. | |
| 2017/0017501 A1 | 1/2017 | Quast | |
| 2017/0125008 A1* | 5/2017 | Maisonnier | G06N 3/008 |
| 2018/0007195 A1 | 1/2018 | Ur | |
| 2018/0234540 A1 | 8/2018 | Ur | |

FOREIGN PATENT DOCUMENTS

| | | |
|---|---|---|
| CN | 108604447 A | 9/2018 |
| DE | 102006058553 A1 | 6/2007 |
| DE | 112016006351 T5 | 10/2018 |
| EP | 2817801 A1 | 12/2014 |
| EP | 2911149 A1 | 8/2015 |
| EP | 3413303 A1 | 12/2018 |
| JP | 03-011400 A | 5/1984 |
| JP | 03-011400 A | 1/1991 |
| JP | 05-088691 A | 4/1993 |
| JP | 2007-160440 A | 6/2007 |
| JP | 2007-199552 A | 8/2007 |
| JP | 2010-204260 A | 9/2010 |
| JP | 2010204260 A * | 9/2010 |
| JP | 1751192 B2 | 8/2011 |
| JP | 2013149050 A * | 8/2013 |
| JP | 2015-513704 A | 5/2015 |
| JP | 2017-509917 A | 4/2017 |
| JP | 2017-138476 A | 8/2017 |
| KR | 10-2007-0062415 A | 6/2007 |
| KR | 10-2014-0131956 A | 11/2014 |
| WO | 2013/137900 A1 | 9/2013 |
| WO | 2015/124831 A1 | 8/2015 |
| WO | 2015/130273 A1 | 9/2015 |
| WO | 2017/134935 A1 | 8/2017 |

OTHER PUBLICATIONS

Tamio Kihara, Yokoyama Masanori, Watanabe Hiroshi; A Composition Method of Situation Conformity Digital-signage Using Human Position and Movement; Feb. 12, 2012 Cited In the IDS dated Oct. 29, 2018; (Year: 2012).*

Kihara, et al., "A Composition Method of Situation Conformity Digital-Signage Using Human Position and Movement", Information Processing Society of Japan, vol. 53, Issue 2, Feb. 15, 2012, pp. 868-878.

International Search Report and Written Opinion of PCT Application No. PCT/JP2016/087096, dated Mar. 14, 2017, 10 pages of ISRWO.

Office Action for JP Patent Application No. 2016-028899, dated Jun. 4, 2019, 07 pages of Office Action and 06 pages of English Translation.

Kihara, et al., "A Composition Method of Situation Conformity Digital-signage Using Human Position and Movement", Information Processing Society of Japan, vol. 53, No. 2, Feb. 2012, 12 pages.

Extended European Search Report of EP Patent Application No. 16890667.5, dated Jan. 29, 2019, 11 pages.

Office Action for JP Patent Application No. 2016-028899, dated Dec. 17, 2019, 07 pages of Office Action and 06 pages of English Translation.

Kihara, et al., "A Composition Method of Situation Conformity Digital-signage Using Human Position and Movement", Journal of Information Processing Society of Japan, vol. 53, No. 2, Feb. 15, 2012, pp. 868-878. (Translation of abstract only).

* cited by examiner

FIG. 3

| ACTION SCORE | STATE OF USER | DISTANCE FROM USER | STATE DURATION |
|---|---|---|---|
| 5 | HAVING INTERACTION UNTIL JUST BEFORE | – | – |
| 4 | APPROACHING MAIN BODY | WITHIN 1 m | – |
| 3 | APPROACHING MAIN BODY | WITHIN 2 m | – |
| 2 | is_watching JUST AFTER START | – | – |
| 1 | is_watching CONTINUE | – | LESS THAN 5 SECONDS |
| 0 | is_watching CONTINUE | – | LESS THAN 10 SECONDS |
| -1 | is_watching CONTINUE | – | LESS THAN 15 SECONDS |
| -2 | is_watching CONTINUE | – | 15 SECONDS OR MORE |
| -3 | not_watching JUST AFTER START | – | – |
| -4 | AWAY FROM MAIN BODY | – | – |
| -5 | not_watching CONTINUE | – | LESS THAN 5 SECONDS |
| -6 | not_watching CONTINUE | – | LESS THAN 10 SECONDS |
| -7 | not_watching CONTINUE | – | LESS THAN 15 SECONDS |
| -8 | not_watching CONTINUE | – | 15 SECONDS OR MORE |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/087096 filed on Dec. 13, 2016, which claims priority benefit of Japanese Patent Application No. JP 2016-028899 filed in the Japan Patent Office on Feb. 18, 2016. Each of the above-referenced applications is hereby incorporated herein by reference in its entirety.

TECHNICAL FIELD

The present disclosure relates to an information processing device, an information processing method, and a program.

BACKGROUND ART

A robot that outputs an action such as speech or information provision to a user is known. For example, a robot that controls an action for a user in accordance with a surrounding environment is disclosed in Patent Literature 1.

CITATION LIST

Patent Literature

Patent Literature 1: JP 2008-254122A

DISCLOSURE OF INVENTION

Technical Problem

In the robot described above (an example of an information processing device), it is desired to output an action according to an intention of the user.

Solution to Problem

According to the present disclosure, there is provided an information processing device including: an action deciding unit configured to decide an action for a user on a basis of a distance from the user; and an output control unit configured to output the action.

In addition, according to the present disclosure, there is provided an information processing method including: deciding, by a processor, an action for a user on a basis of a distance from the user; and outputting the action.

In addition, according to the present disclosure, there is provided a program causing a computer to implement: a function of deciding an action for a user on a basis of a distance from the user; and a function of outputting the action.

Advantageous Effects of Invention

As described above, in accordance with the present disclosure, it is possible to output an action according to an intention of the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a table illustrating a specific example of an attention score by a user managing unit 103.

MODE(S) FOR CARRYING OUT THE INVENTION

Figure 1:
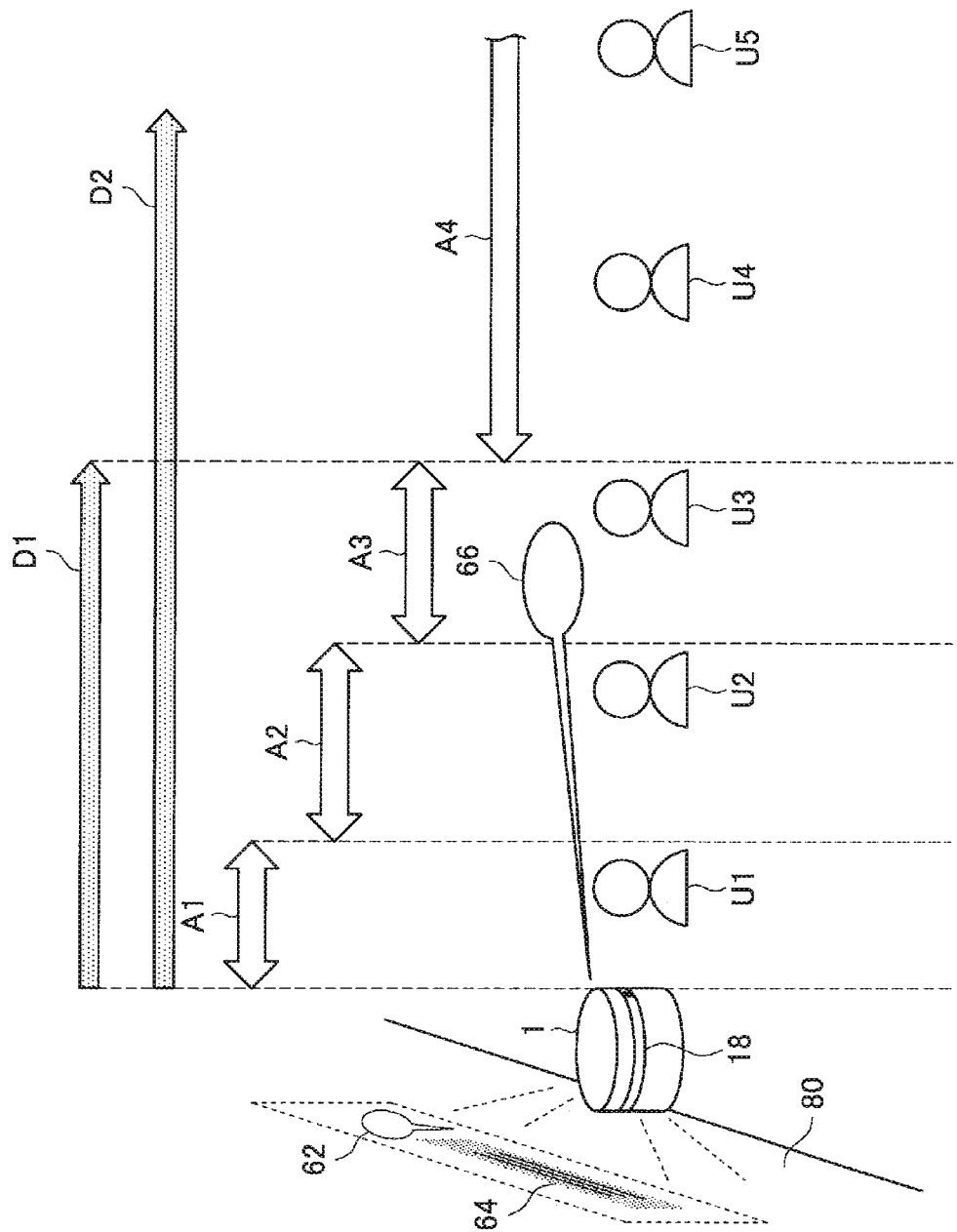
FIG. 1 is an explanatory diagram for describing an overview of an information processing device according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
<<1. Overview>>
<<2. Configuration example>>
<<3. Operation>>
<3-1. First operation example>
<3-2. Second operation example>
<<4. Modified examples>>
<4-1. First modified example>
<4-2. Second modified example>
<4-3. Third modified example>
<<5. Hardware configuration example>>
<<6. Conclusion>>

1. OVERVIEW

A robot (an example of information processing device) that outputs an action for a user is known. Examples of actions that the robot performs for the user include speaking to the user and display for the user. Further, examples of the actions may include speech or display of content to ask what the user wants ("What can I do for you?") or may include speech or display that does not request a user response such as a greeting or muttering.

It is desirable that the robot described above output an action according to the intention of the user. For example, if speech asking what the user wants is performed when the user has nothing that the user wants the robot to do, the user may feel uncomfortable.

In this regard, the present embodiment was made in light of the foregoing. According to the present embodiment, it is possible to output an action according to the intention of a user by deciding an action on the basis of a distance from the user. An overview of an information processing device according to the present embodiment having such an effect will be described below with reference to FIG. 1.

FIG. 1 is an explanatory diagram for describing an overview of an information processing device according to one embodiment of the present disclosure. The information processing device 1 illustrated in FIG. 1 detects a user therearound and outputs an action such as speech to the user by voice or display for the user. Further, the information processing device 1 has a voice UI agent function capable of performing voice recognition/semantic analysis on speech of the user (an example of the user response) and performing a response by voice or display. A series of interactions based on the speech of the user and the response by the information processing device 1 is hereinafter also referred to as a "task."

The information processing device 1 can recognize a voice of the user in a range from the information processing device 1 to a distance D1 illustrated in FIG. 1 and identify the user (a person). The distance D1 may be, for example, 300 cm. Further, the information processing device 1 can detect the user (a person) in a range from the information processing device 1 to a distance D2 illustrated in FIG. 1. The distance D2 may be, for example, 500 cm.

An external appearance of the information processing device 1 is not particularly limited and may be, for example, a columnar shape as illustrated in FIG. 1, and for example, the information processing device 1 is installed on a floor of a room or a table. Further, in the information processing device 1, a light emitting unit 18 constituted by a light emitting element such as a light emitting diode (LED) is installed in the form of a band to surround a central region of a side surface in a horizontal direction. The information processing device 1 can inform the user of a state of the information processing device 1 by causing all or a part of the light emitting unit 18 to emit light. For example, when the information processing device 1 is interacting with the user, the information processing device 1 can cause it look like that its line of sight faces the user who is interacting by causing a part of the light emitting unit 18 in a direction of the user or a direction of a speaker to emit light. Further, when the information processing device 1 is generating a response or searching for data, the information processing device 1 can inform the user that it is in process by performing control such that light turns above the side surface through the light emitting unit 18. Further, the information processing device 1 has a function of projecting and displaying an image on a wall 80, for example, as illustrated in FIG. 1 and can perform an output of an action by display in addition to an output (speech) of an action by voice.

For example, the information processing device 1 illustrated in FIG. 1 decides and outputs an action for the user on the basis of the distance between the information processing device 1 and the user. For example, the information processing device 1 may display a message 62 to ask what a user U1 wants (for example, "What can I do for you?") for the user U1 located in an area A1 in which a distance from the information processing device 1 is a first distance or less. Further, the information processing device 1 displays a message 64 for presenting information such as recommendation information to a user U2 located in an area A2 in which the distance from the information processing device 1 is larger than the first distance and a second distance or less. Further, the information processing device 1 may also output speech that does not request a response such as a greeting to a user U3 located in an area A3 in which the distance from the information processing device 1 is larger than the second distance and a third distance or less.

Here, the third distance may be the distance D1 in which the voice of the user can be recognized. In a case in which an action is output to a user located in an area A4 in which the voice is unable to be recognized, the information processing device 1 may not be able to recognize the voice even when the user responds. In this regard, the information processing device 1 may not output the action for the users U4 and U5 located in the area A4 in which the voice is unable to be recognized.

Further, for example, the first distance may be 80 cm, the second distance may be 200 cm, and the third distance may be 300 cm.

As described above, the information processing device 1 according to the present embodiment can output the action decided on the basis of the distance between the information processing device 1 and the user. The distance between the information processing device 1 and the user is considered to indicate the intention of the user, and for example, a user closer to the information processing device 1 may have something that the user wants the information processing device 1 to do. Therefore, according to such a configuration, it is possible to output an action according to the intention of the user.

The overview of the information processing device 1 according to an embodiment of the present disclosure has been described above. Further, a shape of the information processing device 1 is not limited to a cylindrical shape illustrated in FIG. 1 and may be, for example, a cube, a sphere, a polyhedron, or the like. Next, a configuration example of the information processing device 1 according to the first embodiment of the present disclosure will be sequentially described.

2. CONFIGURATION EXAMPLE

Figure 2:
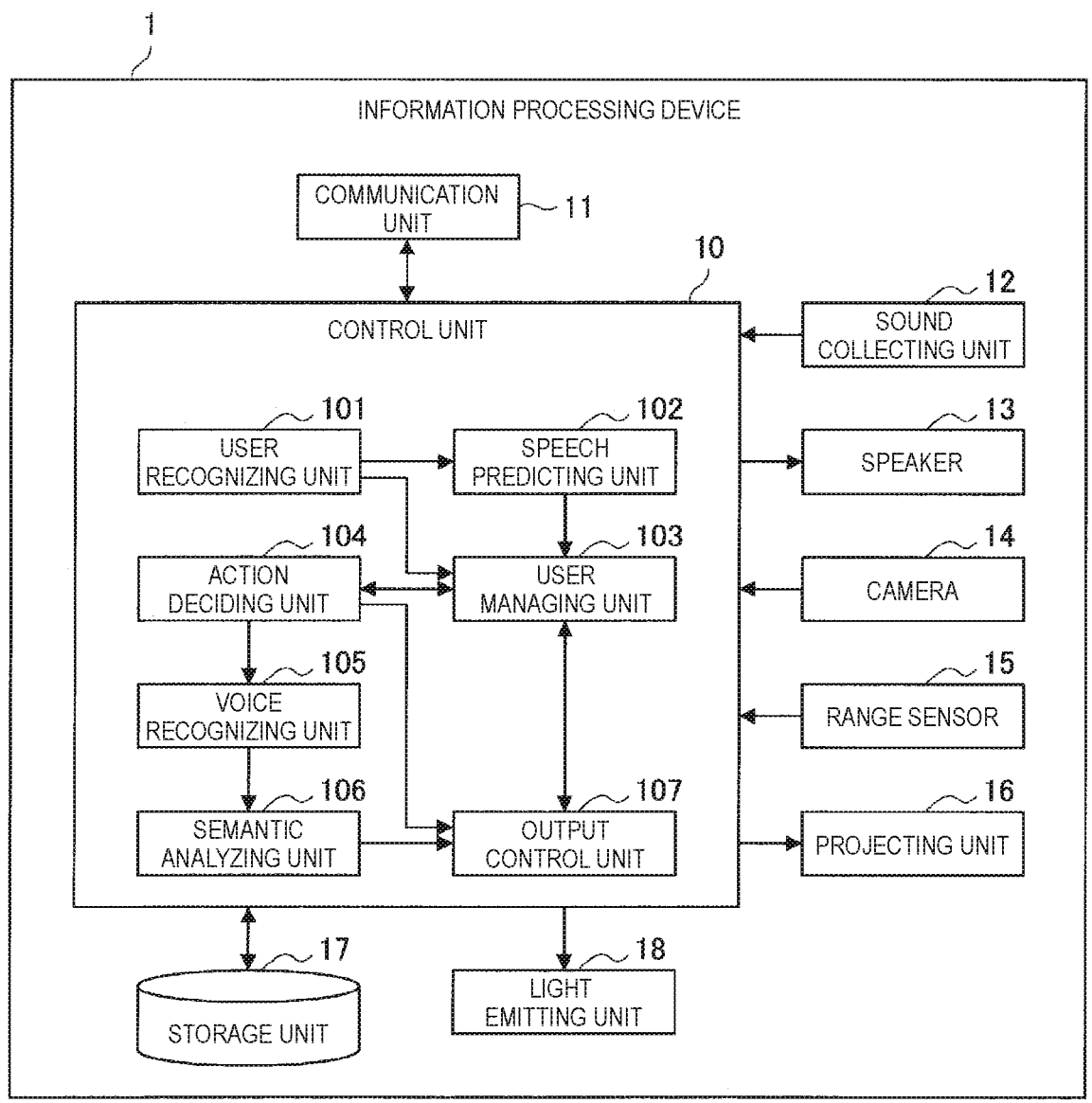
FIG. 2 is a block diagram illustrating an example of a configuration of an information processing device 1 according to the embodiment.

FIG. 2 is a block diagram illustrating an example of the configuration of the information processing device 1 according to the present embodiment. As illustrated in FIG. 2, the information processing device 1 includes a control unit 10, a communication unit 11, a sound collecting unit 12, a speaker 13, a camera 14, a range sensor 15, a projecting unit 16, a storage unit 17, and a light emitting unit 18.

The control unit 10 controls the respective components of the information processing device 1. Further, as illustrated in FIG. 2, the control unit 10 according to the present embodiment also functions as a user recognizing unit 101, a speech predicting unit 102, a user managing unit 103, an action deciding unit 104, a voice recognizing unit 105, a semantic analyzing unit 106, and an output control unit 107.

The user recognizing unit 101 detects and identifies the user near the information processing device 1. For example, the user recognizing unit 101 detects the user using a well-known face detection technique, a person detection technique, or the like on the basis of an image acquired by the camera 14 and the distance acquired by the range sensor 15. Further, the user recognizing unit 101 identifies the user on the basis of the image acquired by the camera 14 using a well-known face recognition technique or the like. For example, the user recognizing unit 101 may identify the user through matching between identification information of a known user stored in the storage unit 17 and information extracted from the user detected in the image.

In a case in which users are detected, the user recognizing unit 101 provides information such as the number of detected users and positions of the users to the speech predicting unit 102. Further, in a case in which users are detected, the user recognizing unit 101 provides the user managing unit 103 with identification information obtained in accordance with the number of detected users and user identification.

The speech predicting unit 102 performs user speech prediction (for example, prediction that the user has an intention to interact with the information processing device 1) for the user detected by the user recognizing unit 101. The speech prediction of the user by the speech predicting unit 102 can be performed in various methods.

For example, the speech predicting unit 102 may predict the speech of the user on the basis of a behavior for conveying an explicit interaction intention by the user. For example, the speech predicting unit 102 may predict the speech of the user in a case in which a predetermined activation word (for example, "Hello Agent" or the like) is detected from the voice of the user collected by the sound collecting unit 12 to be described later. Further, the speech predicting unit 102 may predict the speech of the user in a case in which the user touching the information processing device 1 is detected by a touch sensor (not illustrated) or a physical button. Further, the speech predicting unit 102 may predict the speech of the user in a case in which the user touching the information processing device 1 is detected without the user being detected by the user recognizing unit 101. Further, the speech predicting unit 102 may predict the speech of the user in a case in which the user waving his/her hand is detected on the basis of data obtained by the camera 14 or the range sensor 15 to be described later. Further, the speech predicting unit 102 predicts the speech of the user in a case in which the user clapping his/her hands is detected on the basis of data obtained by the camera 14 or the range sensor 15 to be described later or the sound collected by the sound collecting unit 12. Further, the speech predicting unit 102 may predict the speech of the user in a case in which the user has come directly in front of the information processing device 1 (for example, in a case in which the distance between the information processing device 1 and the user is equal to or less than a predetermined value).

Meanwhile, the behavior for conveying an explicit interaction intention described above may put a burden on the user. For example, in a case in which the speech is predicted by detection of a predetermined activation word, it is necessary for the user to say the activation word before stating what he/she originally has to do, and thus there is a speech burden. Further, in a case in which the speech is predicted by detection of the user touching the information processing device 1, the user should be located in a range in which the information processing device 1 can be touched, and touching or manipulating the information processing device 1 also becomes a burden on the user.

In this regard, the speech predicting unit 102 according to the present embodiment may predict the speech of the user even in a case in which the user does not explicitly perform a behavior of conveying the interaction intention to the information processing device 1 as described above. According to the speech prediction example described below, the burden of the user is reduced as compared with the case in which the user explicitly performs a behavior of conveying the interaction intention to the information processing device 1 as described above.

For example, the speech predicting unit 102 may estimate a direction of the line of sight of the user or a direction of the face on the basis of the data obtained by the camera 14 or the range sensor 15 to be described later or may estimate the speech of the user in a case in which the line of sight or the face of the user faces (the user stares at) the information processing device 1. Further, the speech predicting unit 102 may predict the speech of the user in a case in which the line of sight or the face of the user faces (the user stares at) the information processing device 1 for a predetermined period of time or more.

Further, the speech predicting unit 102 may predict the speech of the user in a case in which the distance from the user obtained by the range sensor 15 is a predetermined value or less.

Further, the speech predicting unit 102 may specify a moving direction or a speed of the user on the basis of the data obtained by the range sensor 15 and predict the speech of the user in a case in which the user approaches the information processing device 1 at a speed of a predetermined value or more.

Further, the speech predicting unit 102 may determine whether or not a task (for example, schedule registration, information retrieval, or the like) which is a series of interactions with the user ends and predict the speech of the user in a case in which the task does not end (is being performed).

The user managing unit 103 performs management related to the user on the basis of the identification information of the user detected by the user recognizing unit 101.

For example, the user managing unit 103 may manage attribute information of the user on the basis of the identification information of the user and the identification information of the user stored in the storage unit 17. For example, the attribute of the user may be any one of a family user belonging to a family having the information processing device 1, a known user other than a family user whose user information is stored in the storage unit 17, or a guest user whose user information is not stored in the storage unit 17.

Further, the user managing unit 103 may specify a target user as a target of an action in a case in which a plurality of users are detected by the user recognizing unit 101. The user managing unit 103 may specify one user as the target user from among a plurality of detected users or may specify a plurality of users as the target user.

The user managing unit 103 may specify an attention score indicating an interaction intention with the information processing device 1 for each detected user on the basis of a state of the user and specify the target user on the basis of the specified attention score.

FIG. 3 is a table illustrating a specific example of the attention score by the user managing unit 103. As illustrated in FIG. 3, the user managing unit 103 may specify the attention score on the basis of the state of the user, the distance from the user, and a duration of the state (a state duration). Further, in FIG. 3, is_watching indicates a state in which the line of sight or the face of the user faces (the user stares at) the information processing device 1. Further, in FIG. 3, not_watching indicates a state in which the line of sight or the face of the user does not face (the user does not stare at) the information processing device 1.

According to the table illustrated in FIG. 3, the user managing unit 103 may specify the attention score for each detected user and specify the user having the highest attention score as the target user. Further, the user managing unit 103 may specify that there is no target user (no action target) in a case in which the attention scores of all the detected users are 0 or less.

Further, the specifying of the target user by the user managing unit 103 is not limited to the above example. For example, in a case in which the speech of the user is predicted by the speech predicting unit 102, the user may be specified as the target user. Further, the user managing unit 103 may classify the users into a plurality of types on the basis of the state of the user and specify the target user on the basis of the classified types of the users. Such an example will be described later as a second operation example.

Further, the user managing unit 103 manages the output information of the action for each user. For example, in a case in which an action for the user is output under the control of the output control unit 107 to be described later, the user managing unit 103 stores output information of the action including a time at which the action is output to the user in the storage unit 17. Further, the user managing unit 103 may identify the target user on the basis of the output information. For example, in a case in which the action decided by the action deciding unit 104 is output to the same user within a predetermined period of time, the user is not specified as the target user, and thus the same action is prevented from being output to the same user frequently.

The action deciding unit 104 decides the action for the user on the basis of the distance from the user. For example, the action deciding unit 104 may decide the action on the basis of the distance between the information processing device 1 and the user obtained from the range sensor 15.

For example, the action decided by the action deciding unit 104 may be an action requesting a response from the user such as display or speech asking what the user wants or may be an action not requesting a response from the user such as information presentation, greeting, or muttering.

Further, content of the information presentation may be, for example, information corresponding to each user such as an unread e-mail (an unread message), new arrival information of a social service, and update information of a web site which the user frequently visits. Further, private information such as an unread e-mail may be displayed in a case in which only one user is detected as the user. Further, information which is allowed to be shared among persons located in the same place such as a television program which can be watched now may be displayed in a case in which a plurality of users are detected.

In a case in which the distance from the user is the first distance or less (for example, in a case in which the user is located in the area A1 described above with reference to FIG. 1), the action deciding unit 104 may decide the action requesting the user response as the action for the user. According to such a configuration, it is possible to more smoothly start an interaction with the user closer to the information processing device 1.

Further, the action deciding unit 104 may decide the action not requesting the user response as the action for the user in a case in which the distance from the user is larger than the first distance.

Further, in a case in which the distance from the user is larger than the first distance and equal to or less than the second distance (for example, in a case in which the user is located in the area A2 described above with reference to FIG. 1), the action deciding unit 104 decides the display not requesting the user response as the action for the user. Further, in a case in which the distance from the user is larger than the second distance and equal to or less than the third distance (for example, in a case in which the user is located in the area A3 described above with reference to FIG. 1), the action deciding unit 104 decides the speech not requesting the user response as the action for the user. For example, in the output function of the information processing device 1, in a case in which the action by speech is more likely to be recognized by the user who is far away than the action by display, according to such a configuration, the action for the user is more likely to be recognized by the user.

Further, in a case in which the speech predicting unit 102 predicts the speech of the user, and the user managing unit 103 specifies the user as the target user, the action deciding unit 104 may decide the action requesting the user response as the action for the user. According to such a configuration, it is possible to more smoothly start the interaction with the user whose speech is already predicted.

Further, in a case in which a plurality of users are detected by the user recognizing unit 101, the action deciding unit 104 may decide the action on the basis of the distance from the target user. Further, in a case in which a plurality of users are detected by the user recognizing unit 101, the action deciding unit 104 may decide the action for the user on the basis of the type of user classified by the user managing unit 103. For example, the action deciding unit 104 may decide the action for the user in accordance with the distance from the user having the smallest distance from the user among the users classified into a predetermined type.

Further, in a case in which the user managing unit 103 specifies the target user on the basis of the attention score described above with reference to FIG. 3, the action deciding unit 104 may decide the action on the basis of the attention score. For example, the action deciding unit 104 may decide the action requesting the user response as the action for the user in a case in which the user whose attention score is a predetermined value or more is the target user.

Further, the action deciding unit 104 may decide the action on the basis of the attribute information of the user managed by the user managing unit 103. For example, the action deciding unit 104 may decide the action not requesting the user response as the action for the user in a case in which there is a user having a predetermined attribute among the detected users. A user having a predetermined attribute may be, for example, a user to whom it is not desirable to give manipulation authority of the information processing device 1 or may be, for example, a known user or a guest user. According to such a configuration, it is possible to restrict the information processing device 1 from being manipulated by, for example, a user other than a family user.

The action deciding unit 104 provides action information relating to a decided action to the output control unit 107. Further, in a case in which the decided action is the action requesting the user response, the action deciding unit 104 may give a notification indicating that the decided action is the action requesting the user response to the voice recognizing unit 105.

The voice recognizing unit 105 recognizes the voice of the user collected by the sound collecting unit 12 to be described later, converts the voice into a character string, and acquires speech text. Further, it is also possible to identify a person who is speaking on the basis of a voice feature of the voice recognizing unit 105 or to estimate a source of the voice, that is, a direction of the speaker.

Further, in a case in which a predetermined activation word is included in the acquired speech text, the voice recognizing unit 105 may give a notification indicating that the activation word has been detected to the speech predicting unit 102. Further, the voice recognizing unit 105 may compare the activation word with other speech text and detect the activation word more reliably with respect to the noise.

Further, the voice recognizing unit 105 may start the voice recognition other than the above-mentioned activation word in a case in which the action deciding unit 104 decides the action requesting the user response as the action for the user. According to such a configuration, the voice recognizing unit 105 can smoothly recognize the speech response by the user performed after the action is output.

The semantic analyzing unit 106 performs semantic analysis on the speech text acquired by the voice recognizing unit 105 using a natural language process or the like. A result of the semantic analysis by the semantic analyzing unit 106 is provided to the output control unit 107.

The output control unit 107 controls the speaker 13, the projecting unit 16, and the light emitting unit 18 to be described later such that the action for the user decided by the action deciding unit 104 is output. For example, the output control unit 107 may control the speaker 13 such that the speech of the voice is output as an action or may control the projecting unit 16 such that display of a message or information is output as an action.

The output control unit 107 may output the action to the target user specified by the user managing unit 103. Further, in a case in which the action for the user is output, the output control unit 107 may provide information related to the output action and information related to the user for whom the action is output to the user managing unit 103.

The output control unit 107 controls a response to the speech of the user or an output related to a task such as an operation required by the user in accordance with the semantic analysis result provided from the semantic analyzing unit 106. For example, in a case in which the speech of the user is to obtain "tomorrow's weather," the output control unit 107 acquires information related to "tomorrow's weather" from a weather forecast server on a network, and controls the speaker 13, the projecting unit 16, or the light emitting unit 18 such that the acquired information is output. In such an example, it may be regarded that the task has ended at a time point at which information related to "tomorrow's weather" is output.

The communication unit 11 exchanges data with an external device. For example, the communication unit 11 establishes a connection with a predetermined server (not illustrated) via a communication network (not illustrated) and receives information necessary for output control by the output control unit 107.

The sound collecting unit 12 has a function of collecting the ambient sound and outputting the collected sound to the control unit 10 as an audio signal. Further, for example, the sound collecting unit 12 may be implemented by one or more microphones.

The speaker 13 has a function of converting the audio signal into a voice and outputting the voice under the control of the output control unit 107.

The camera 14 has a function of imaging a surrounding area with an imaging lens installed in the information processing device 1 and outputting the captured image to the control unit 10. Further, the camera 14 may be implemented by, for example, a 360 degree camera, a wide angle camera, or the like.

The range sensor 15 has a function of measuring a distance between the information processing device 1 and the user or a person around the user. The range sensor 15 is implemented by, for example, an optical sensor (a sensor that measures a distance to an object on the basis of phase difference information at a light emission/reception timing).

The projecting unit 16 is an example of a display device and has a function of performing display by projecting (enlarging) an image on a wall or a screen.

The storage unit 17 stores a program and a parameter causing the respective components of the information processing device 1 to function. For example, the storage unit 17 may store information related to the user such as the identification information of the user and the attribute information of the user, speech content to be output, information related to an action such as display content, and the like.

The light emitting unit 18 is implemented by a light emitting element such as an LED and can perform full lighting, partial lighting, blinking, lighting position control, and the like. For example, the light emitting unit 18 can cause it look like that the line of sight faces in the direction of the speaker by lighting a part thereof in the direction of the speaker recognized by the voice recognizing unit 105 in accordance with the control of the control unit 10.

The configuration of the information processing device 1 according to the present embodiment has been specifically described above. Further, the configuration of the information processing device 1 illustrated in FIG. 2 is an example, and the present embodiment is not limited thereto. For example, the information processing device 1 may further include an infrared (IR) camera, a depth camera, a stereo camera, a human sensor or the like in order to obtain information related to the surrounding environment. Further, the information processing device 1 may further include a touch panel display, a physical button, or the like as a user interface. Further, the installation positions of the sound collecting unit 12, the speaker 13, the camera 14, the light emitting unit 18, and the like installed in the information processing device 1 are not particularly limited. Further, the functions of the control unit 10 according to the present embodiment may be performed by another information processing device connected via the communication unit 11.

3. OPERATION

Next, several operation examples of the information processing device 1 according to the present embodiment will be described with reference to FIGS. 4 to 16.

3-1. First Operation Example

First, an operation example in which the action requesting the user response is performed, and the voice recognition is started will be described below with reference to FIGS. 4 and 5 as a first operation example.

Figure 4:
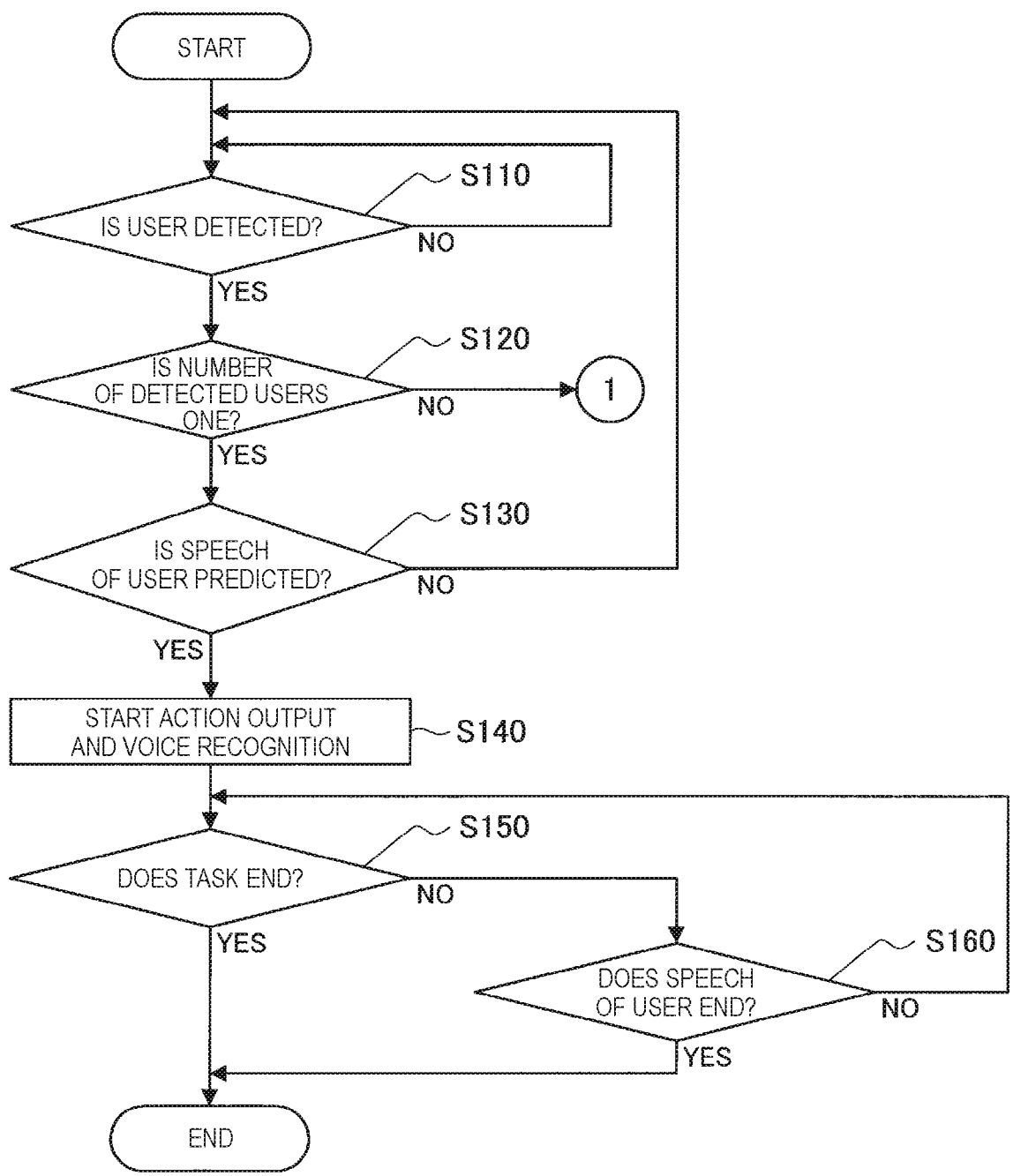
FIG. 4 is a flowchart illustrating an operation example of an information processing device 1 according to the embodiment.
Figure 5:
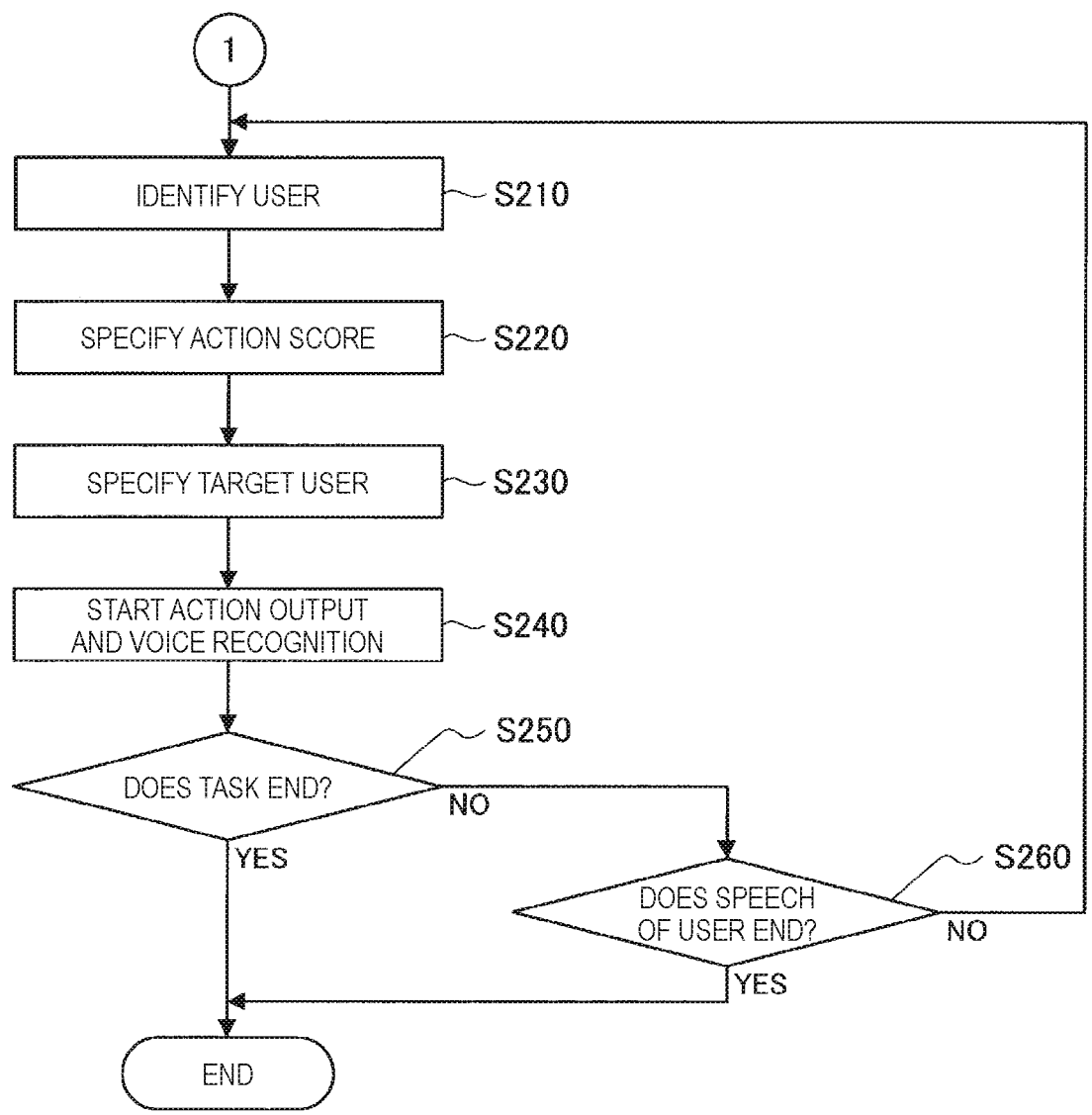
FIG. 5 is a flowchart illustrating an operation example of an information processing device 1 according to the embodiment.

FIGS. 4 and 5 are flowchart diagrams illustrating an operation example of the information processing device 1 according to the present embodiment. As illustrated in FIG. 4, first, the control unit 10 repeats a user detection process (S110) until the user is detected near the information processing device 1. In a case in which the number of detected users is one (YES in S110 and YES in S120), if the speech predicting unit 102 predicts the speech of the user (YES in S130), the action requesting the user response is specified and output, and the voice recognition is started (S140). Further, the prediction of the speech of the user is not limited to the prediction based on the behavior of explicitly conveying the interaction intention by the user and may be prediction based on the user's stare, the distance from the user, or the moving speed of the user as described above. In the present operation example, in a case in which the speech of the user is not predicted (NO in S130), the process may return to step S110.

After the action is output, if the speech of the user and the task which is a series of interaction by the response by the information processing device 1 ends (YES in S150), the process ends. Further, if none of the task and the speech of the user ends (NO in S150 and NO in S160), the voice recognition is continued until the task ends. On the other hand, in a case in which the task does not end, but the speech of the user ends (NO in S150 and YES in S160), the process ends. Further, for example, the control unit 10 may determine whether or not the speech of the user ends, and in a case in which the non-speech period continues for a predetermined period of time (for example, 15 seconds), the control unit 10 may determine that the speech of the user ends.

Further, in a case in which a plurality of users are detected by the user recognizing unit 101 (NO in S120), the user recognizing unit 101 and the user managing unit 103 perform user identification (S210 in FIG. 5). Next, the user managing unit 103 specifies the attention score described above with reference to FIG. 3 for each user (S220) and identifies the user having the highest attention score as the target user (S230). Further, in a case in which the speech predicting unit 102 predicts the speech of the user on the basis of the behavior of explicitly conveying the interaction intention by the user (the speech of the activation word or the like), in step S230, the user may be specified as the target user.

Next, the action requesting the user response is specified by the action deciding unit 104, the action is output in accordance with the control of the output control unit 107, and the voice recognition is started (S240).

After the action is output, if the speech of the user and the task which is a series of interactions by the response by the information processing device 1 ends (YES in S250), the process ends. Further, in a case in which none of the task and the speech of the user ends (NO in S250 and NO in S260), the process returns to step S210 while the voice recognition is continued. On the other hand, in a case in which the task does not end, but the speech of the user ends (NO in S250 and YES in S260), the process ends. Further, the control unit 10 may determine whether or not the speech of the user ends as described above.

3-2. Second Operation Example

In the first operation example described above, the operation example in which the action requesting the user response is performed on the basis of the speech prediction, and the voice recognition is started has been described. Next, in a second operation example to be described below, a specific example of the action according to the distance from the user will be specifically described.

First, an operation example in a case in which one user is detected by the information processing device 1 will be described with reference to FIGS. 6 and 7, and then an operation example in a case in which a plurality of users are detected by the information processing device 1 will be described with FIGS. 8 to 16.

Figure 6:
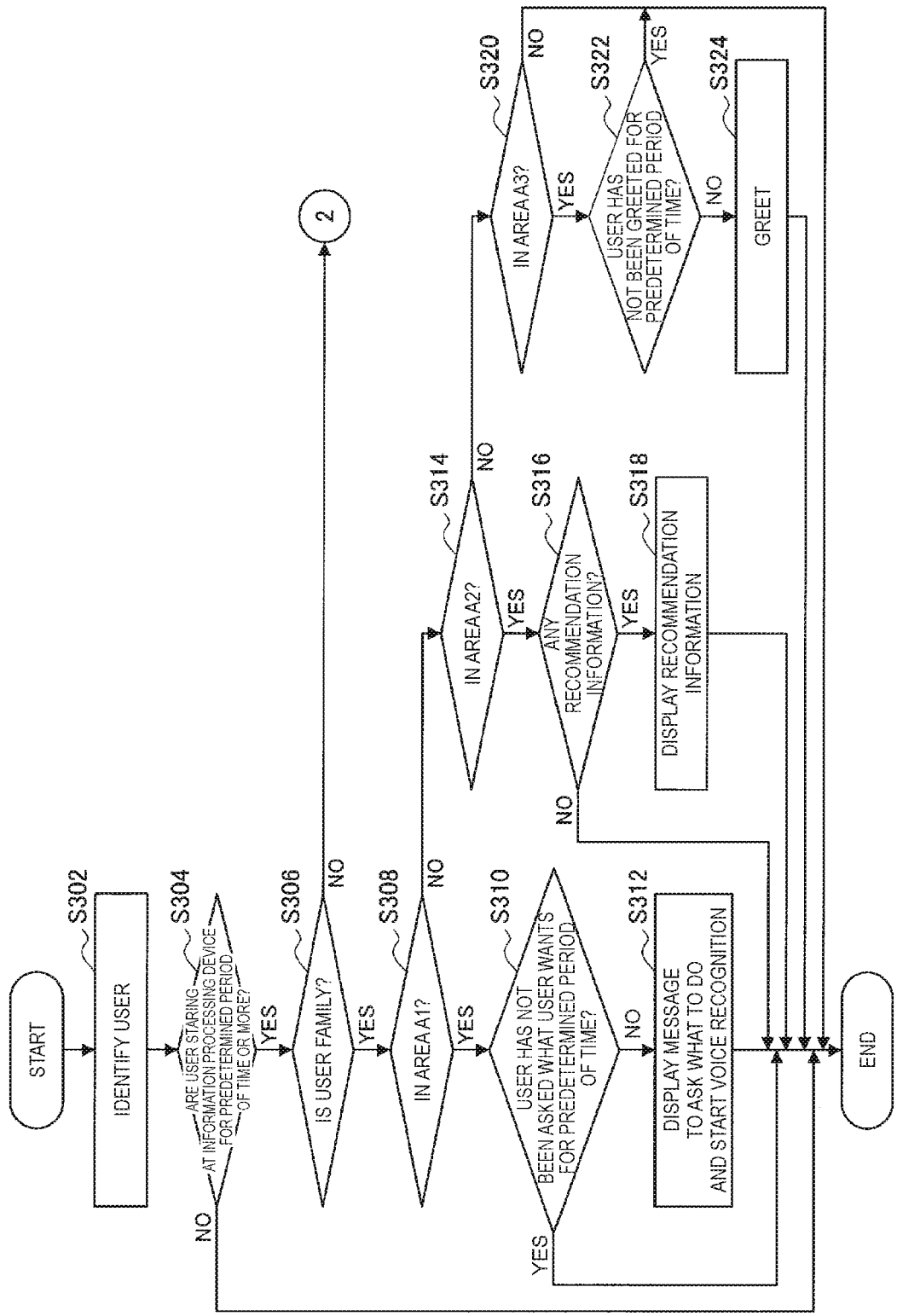
FIG. 6 is a flowchart illustrating an operation example of an information processing device 1 in a case in which there is only one user near an information processing device 1 according to the embodiment.
Figure 7:
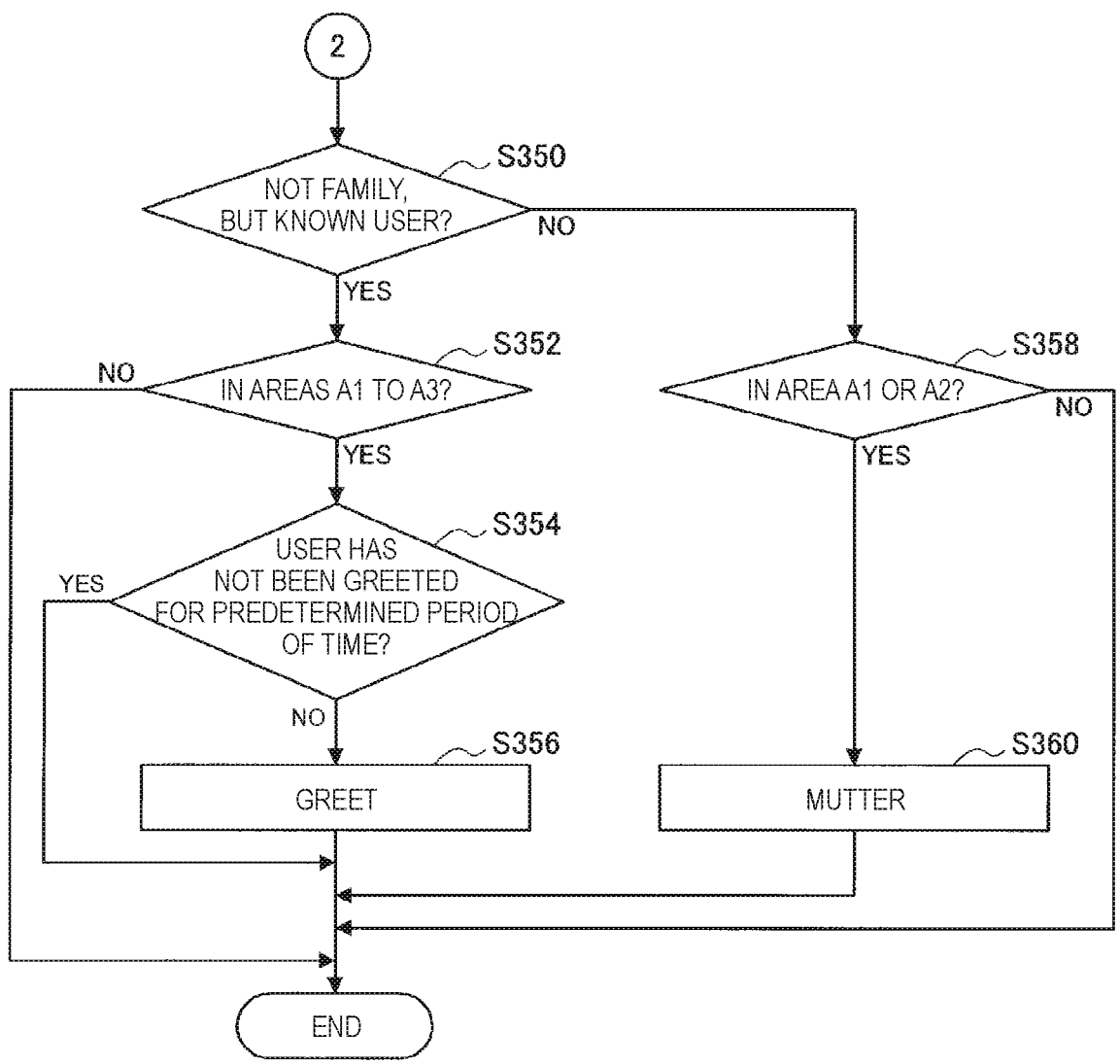
FIG. 7 is a flowchart illustrating an operation example of an information processing device 1 in a case in which there is only one user near an information processing device 1 according to the embodiment.

FIGS. 6 and 7 are flowchart diagrams illustrating an operation example of the information processing device 1 in a case in which there is only one user near the information processing device 1 according to the present embodiment. As illustrated in FIG. 6, first, the control unit 10 detects and identifies the user (S302). In a case in which the user managing unit 103 determines that the state (is_watching) in which the user is staring at the information processing device 1 continues for a predetermined period of time or more (YES in S304), the process proceeds to step S306. On the other hand, in a case in which it is not determined that the state (is_watching) in which the user is staring at the information processing device 1 continues for the predetermined period of time or more (NO in S304), the process ends, for example.

In step S306, in a case in which the user managing unit 103 determines that the user is the family user (YES in S306), the process proceeds to step S308. On the other hand, in a case in which the user managing unit 103 determines that the user is not the family user, the process proceeds to step S350 of FIG. 7.

In a case in which the action deciding unit 104 determines that the user is located in the area A1 (YES in S308), in step S310, the user managing unit 103 determines whether or not the user has been asked what the user wants within a predetermined period of time. In a case in which the user has not been asked what the user wants for a predetermined period of time (NO in S310), the output control unit 107 displays a message to ask what to do, and the voice recognition by the voice recognizing unit 105 is started (S312). Further, here, hereinafter, a process after the voice recognition is started may be similar to the process of steps S150 and S160 described above with reference to FIG. 4, and description thereof is omitted. In a case in which the user has been asked what the user wants within the predetermined period of time (YES in S310), the process ends.

In a case in which the action deciding unit 104 determines that the user is located in the area A2 (NO in S308 and YES in S314), the process proceeds to step S316. In step S316, the control unit 10 determines whether or not there is recommendation information (information capable of presenting information) to the user. In a case in which there is no recommendation information (NO in S316), the process ends, and in a case in which there is recommendation information (YES in S316), the output control unit 107 displays the recommendation information (S318).

In a case in which the action deciding unit 104 determines that the user is located in the area A3 (NO in S308, NO in S314, and YES in S320), the process proceeds to step S322. In step S322, the user managing unit 103 determines whether or not the user has been greeted within a predetermined period of time. In a case in which the user has not been asked what the user wants for the predetermined period of time (NO in S322), the output control unit 107 causes greeting to be sent to the user by the voice speech (S324). In a case in which the user has been greeted within a predetermined period of time in step S322 (YES in S322), the process ends.

Further, in a case in which there is no user in any of the areas A1 to A3 (NO in S308, NO in S314, and NO in S320), the process ends.

In a case in which the user managing unit 103 determines that the user is not a family user in step S306 (NO in S306), the process proceeds to step S350 illustrated in FIG. 7.

In a case in which the user managing unit 103 determines that the user is a known user, and the action deciding unit 104 determines that the user is located in any one of the areas A1 to A3 (YES in S350 and YES in S352), the process proceeds to S354. Since a process of steps S354 and S356 is similar to the processes of steps S322 and S324, description thereof is omitted. On the other hand, in a case in which it is determined that there is no user in any of the areas A1 to A3 (NO in S352), the process ends.

In a case in which the user managing unit 103 determines that the user is a known user, and the action deciding unit 104 determines that the user is located in any one of the areas A1 to A3 (YES in S350 and YES in S352), the process proceeds to S354. Since a process of steps S354 and S356 is similar to the process of steps S322 and S324, description thereof is omitted.

In a case in which the user managing unit 103 determines that the user is neither the family user nor the known user (the guest user) (NO in step S350), the process proceeds to step S358. In a case in which the action deciding unit 104 determines that the user is located in the area A1 or A2 in step S358 (YES in S358), unilateral muttering speech output to the user is performed by the output control unit 107 (S360), and the process ends. Examples of contents muttered by the information processing device 1 are as follows. For example, the following example may be spoken one by one.

"That? There is a strange person . . . "
"Is it a customer?"
"I feel nervous somehow . . . "
"Well, I feel like resembling someone . . . "
"It is nice clothes."

On the other hand, in a case in which the action deciding unit 104 determines that the user is not located in the area A1 or A2 in step S358 (NO in S358), the process ends.

The operation example in the case in which one user is detected by the information processing device 1 has been described above. Next, an operation example in a case in which a plurality of users are detected by the information processing device 1 will be described with reference to FIGS. 8 to 16. Further, in the following, an operation example in a case in which there is only a family user near the information processing device 1 with reference to FIGS. 8 to 14 will be described, and then an operation example in a case in which there is a guest user near the information processing device 1 will be described with reference to FIGS. 15 and 16.

Figure 8:
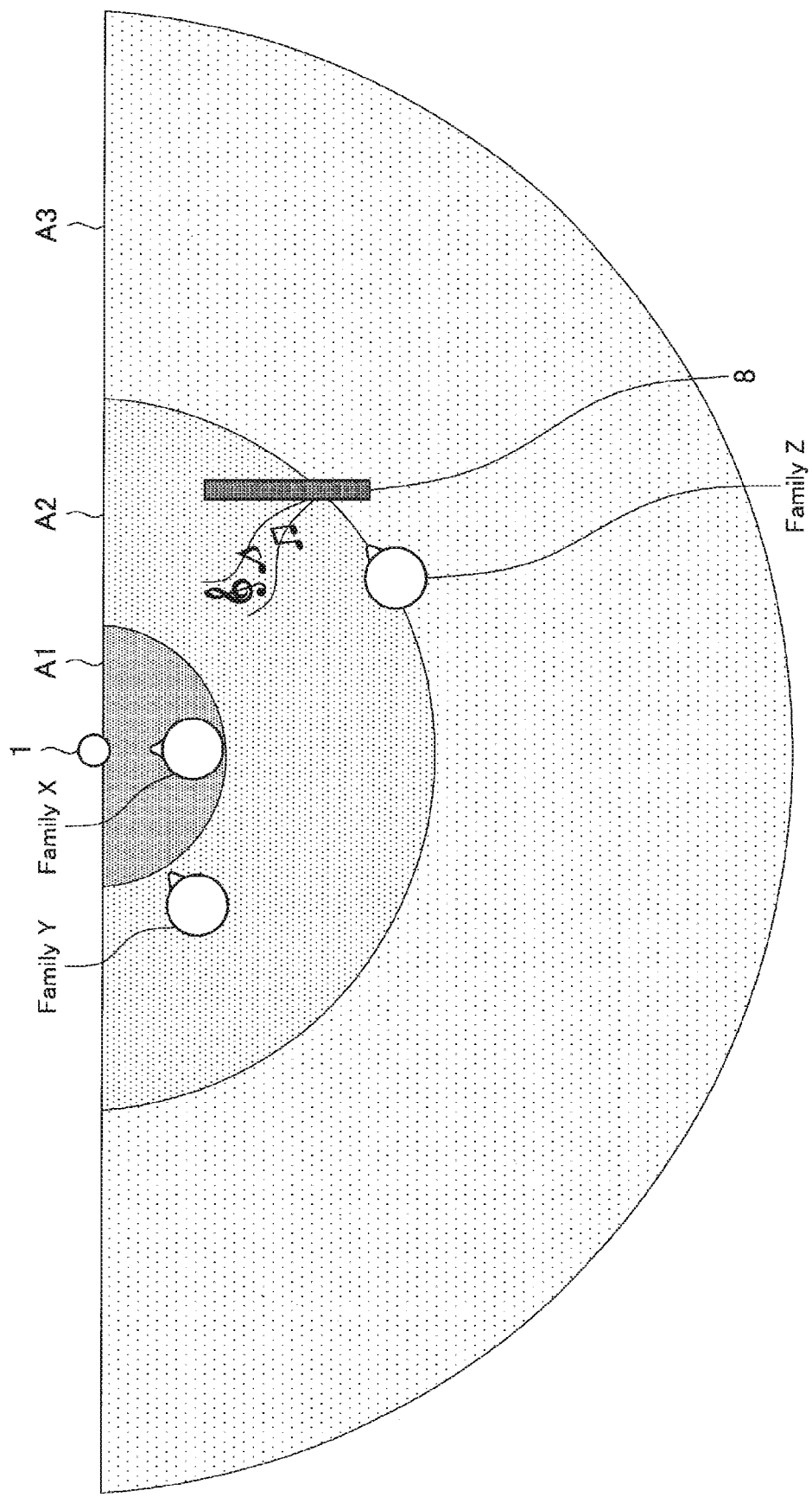
FIG. 8 is an explanatory diagram illustrating a scene in which there are a plurality of family users near an information processing device 1 according to the embodiment.
Figure 9:
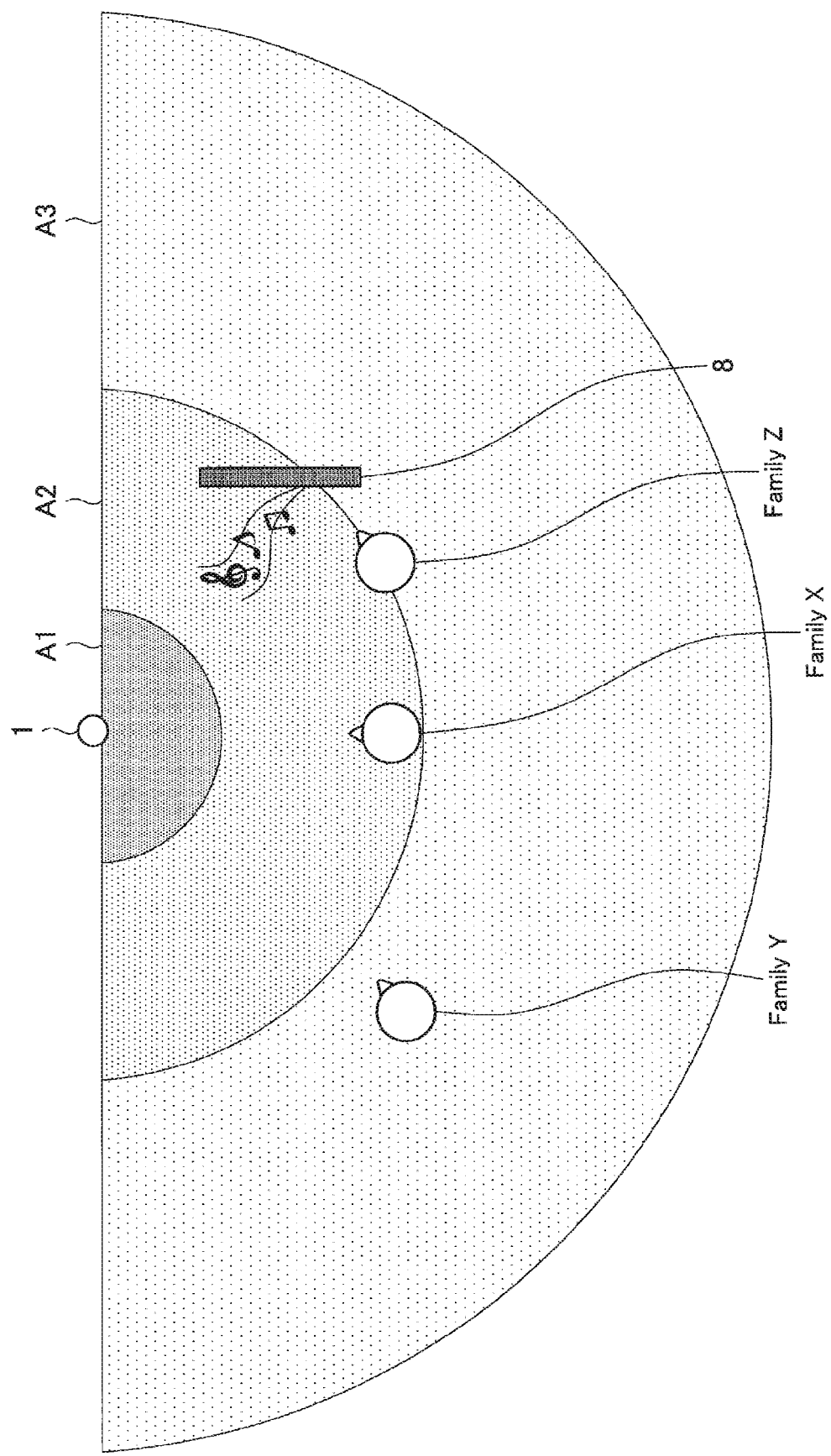
FIG. 9 is an explanatory diagram illustrating a scene in which there are a plurality of family users near an information processing device 1 according to the embodiment.
Figure 10:
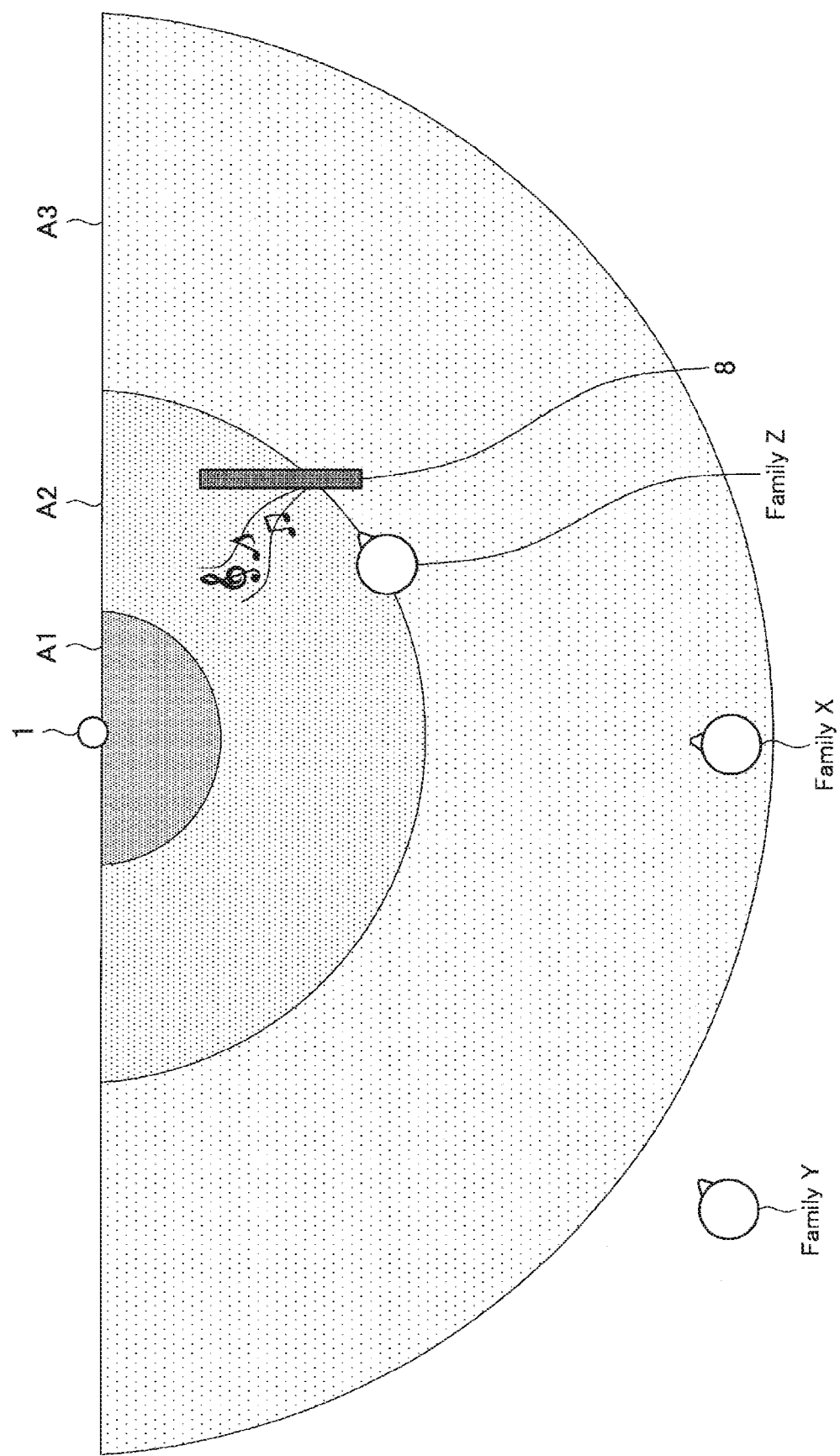
FIG. 10 is an explanatory diagram illustrating a scene in which there are a plurality of family users near an information processing device 1 according to the embodiment.

FIGS. 8 to 10 are explanatory diagrams illustrating scenes in which there are a plurality of family users near the information processing device 1. In FIGS. 8 to 10, there are family users X, Y, and Z near the information processing device 1. Further, for example, the family users X and Y stare at the information processing device 1, and the family user Z stares at a television receiver 8 without staring at the information processing device 1. In the following description, FIGS. 8 to 10 are referred to as appropriate.

Figure 11:
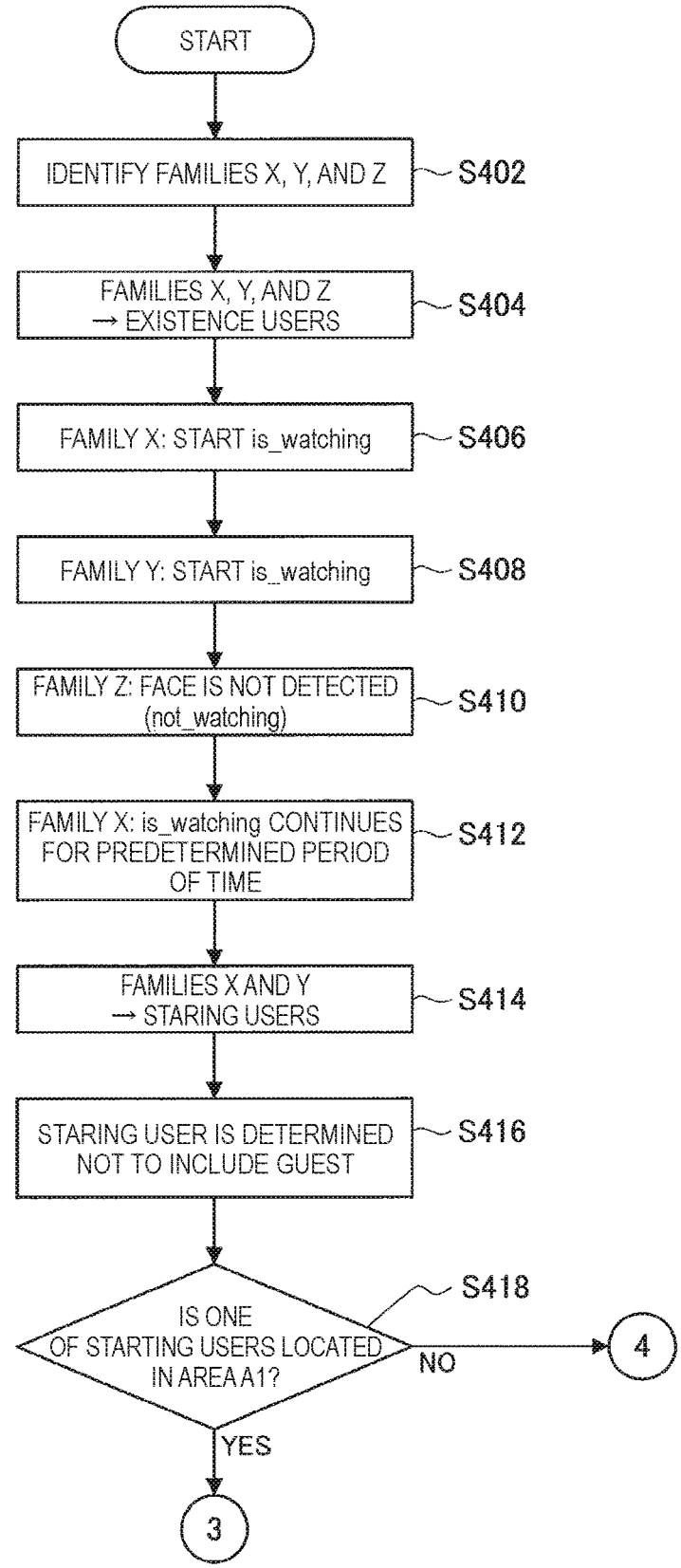
FIG. 11 is a flowchart illustrating an operation example of an information processing device 1 according to the embodiment in the scenes illustrated in FIGS. 8 to 10.

FIGS. 11 to 14 are flowchart diagrams illustrating an operation example of the information processing device 1 according to the present embodiment in any one of the scenes illustrated in FIGS. 8 to 10. As illustrated in FIG. 11, first, the user recognizing unit 101 and the user managing unit 103 identify the family users X, Y, and Z (S402). Then, the user managing unit 103 classifies types of the family users X, Y, and Z as existence users (S402).

Here, it is assumed that the state of the family user X among the family users X, Y, and Z becomes is_watching (S406), the state of the family user Y becomes is_watching (S408), and the state of the family user Z is a state in which the face is not detected (not_watching) (S410). Then, at a time point at which the state of the family user X is determined to continue for a predetermined period of time (for example, 2 seconds) as is_watching (S412), the type of the family users X and Y in the is_watching state is classified as staring users (S414). Further, in a case in which a predetermined period of time (for example, one minute) elapses while the state of the family user Z is a state in which the face is not detected (not_watching), the family user Z may be deleted from the existence users.

Then, it is determined whether or not the staring user includes the guest user, but in the present operation example, it is determined that the staring user does not include the guest user since only the family users X and Y are classified as the staring users (S416). Further, an example in which the staring user includes the guest user will be described with reference to FIGS. 15 and 16.

Figure 12:
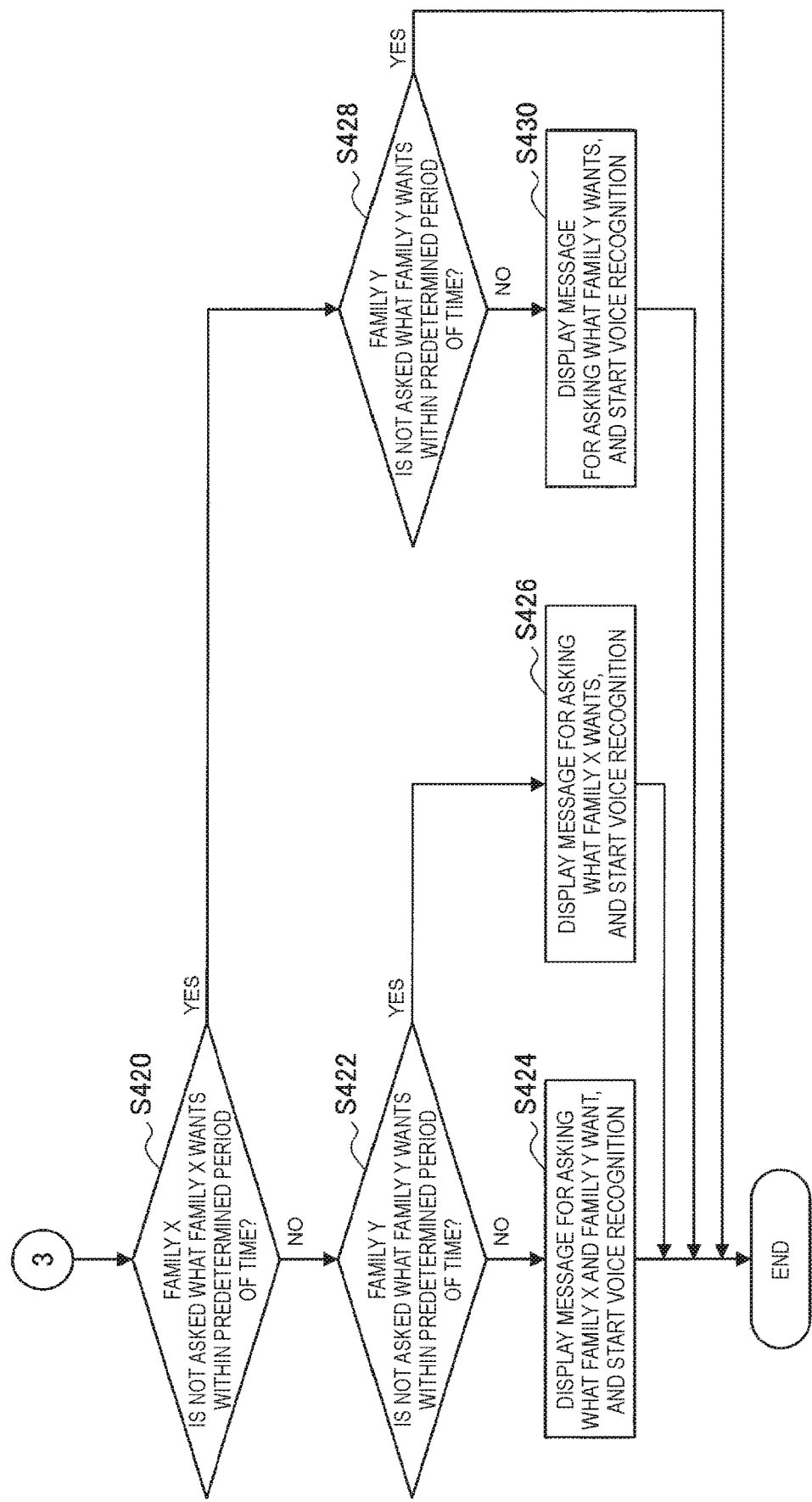
FIG. 12 is a flowchart illustrating an operation example of an information processing device 1 according to the embodiment in the scenes illustrated in FIGS. 8 to 10.

As illustrated in FIG. 8, in a case in which one of the staring users is located in the area A1 (YES in S418), the process proceeds to step S420 of FIG. 12. In a case in which both the family user X and the family user Y are not asked what they want within a predetermined period of time (NO in S420 and NO in S422), the output control unit 107 causes a message to be displayed for asking what the family user X and the family user Y want, and the voice recognition is started by the voice recognizing unit 105 (S424). Further, in a case in which the family user X is not asked, but the family user Y is asked what the family user Y wants within a predetermined period of time (NO in S420 and YES in S422), the output control unit 107 causes a message to be displayed for asking what the family user X wants, and the voice recognition is started by the voice recognizing unit 105 (S426). Further, in a case in which the family user X is asked, but the family user Y is not asked what the family user Y wants within a predetermined period of time (YES in S420 and NO in S428), the output control unit 107 causes a message to be displayed for asking what the family user Y wants, and the voice recognition is started by the voice recognizing unit 105 (S430). Further, in a case in which both the family user X and the family user Y are asked what they want within a predetermined period of time (YES in S420 and YES in S428), the process ends.

Figure 13:
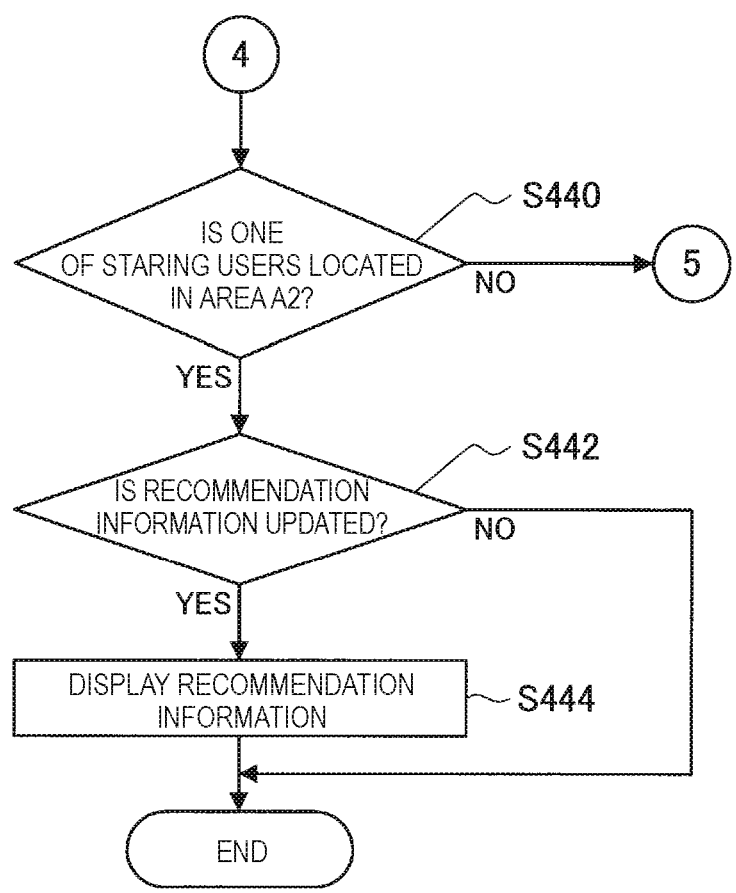
FIG. 13 is a flowchart illustrating an operation example of an information processing device 1 according to the embodiment in the scenes illustrated in FIGS. 8 to 10.

Further, as illustrated in FIG. 9, in a case in which the staring user is not located in the area A1 (NO in S418), the process proceeds to step S440 of FIG. 13. In a case in which any one of the staring users is located in the area A2 in step S440 (YES in S440), the process proceeds to step S442.

Since a process of steps S422 and S444 is similar to the process of step S316 and S318 of FIG. 6, description thereof is omitted.

Figure 14:
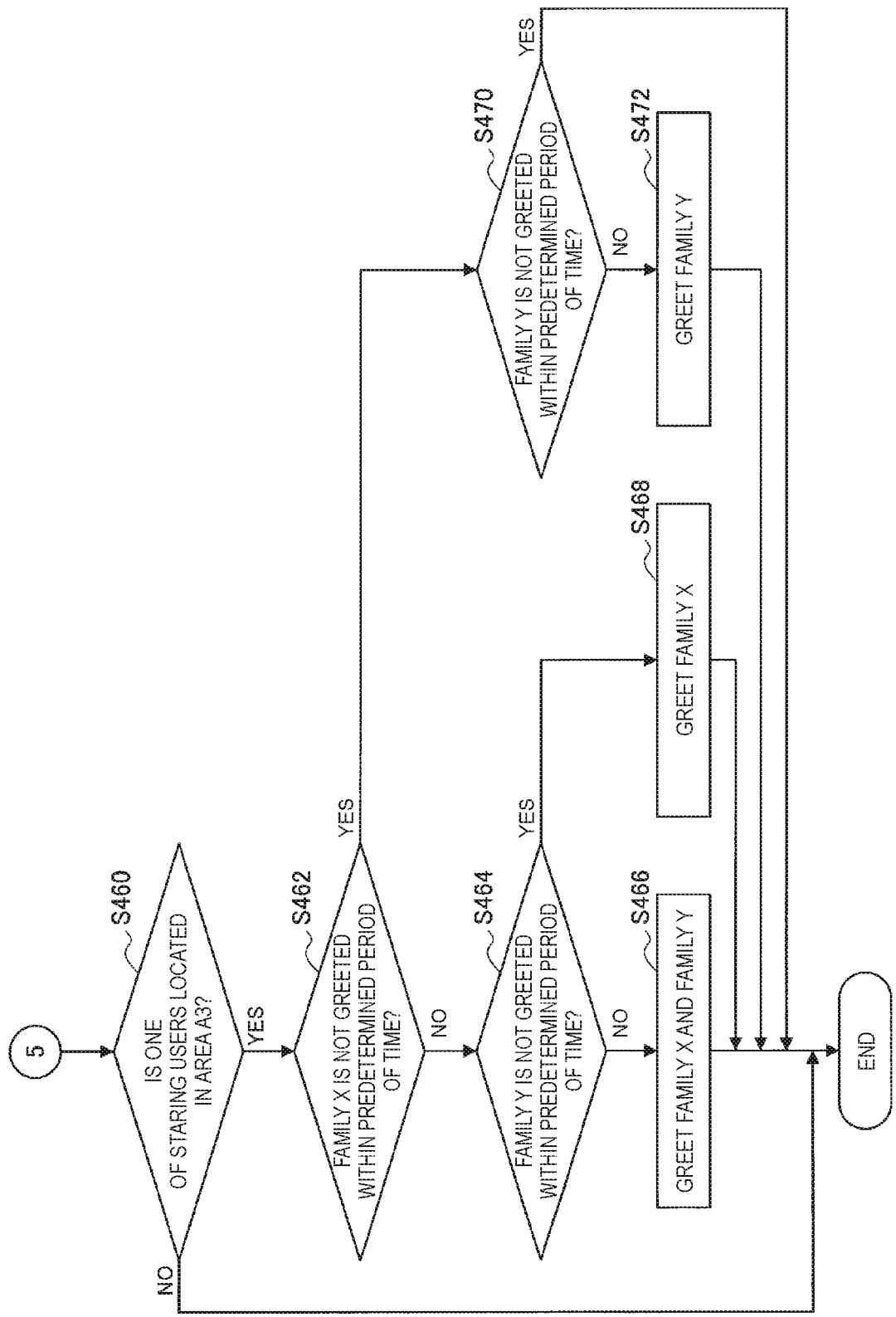
FIG. 14 is a flowchart illustrating an operation example of an information processing device 1 according to the embodiment in the scenes illustrated in FIGS. 8 to 10.

Further, as illustrated in FIG. 10, in a case in which the staring user is not located in the areas A1 and A2 (NO in S440), the process proceeds to step S460 of FIG. 14. In a case in which the staring user is not located in the area A3 in step S460 (NO in S460), the process ends, and in a case in which any one of the staring users is located in the area A3 (YES in S460), the process proceeds to step S462.

In a case in which both the family user X and the family user Y are not greeted within a predetermined period of time (NO in S462 and NO in S464), the output control unit 107 causes greeting to the family user X and the family user Y to be output by the voice speech (S466). Further, in a case in which the family user X is not greeted within a predetermined period of time, but the family user Y is greeted (NO in S462 and YES in S464), the output control unit 107 causes greeting to the family user X to be output by the voice speech (S468). Further, in a case in which the family user X is greeted within a predetermined period of time, but the family user Y is not greeted (YES in S462 and NO in S470), the output control unit 107 causes greeting to the family user Y to be output by the voice speech (S472). Further, in a case in which the family user X and the family user Y are asked what they want within a predetermined period of time (YES in S462 and YES in S470), the process ends.

The operation example in the case in which there are only a plurality of family users near the information processing device 1 has been described above. Next, an operation example in a case in which there is a guest user near the information processing device 1 will be described with reference to FIGS. 15 and 16.

Figure 15:
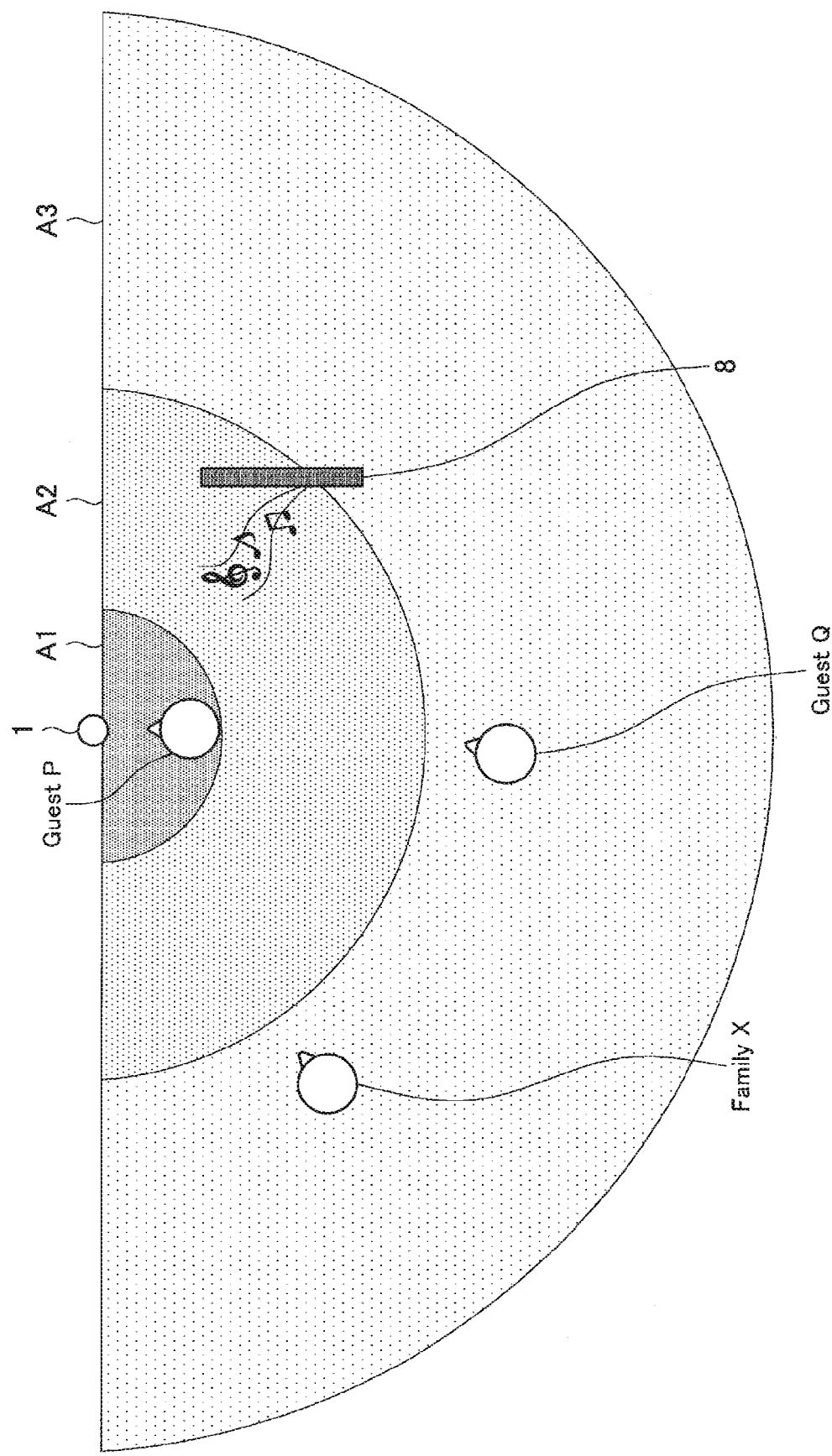
FIG. 15 is an explanatory diagram illustrating a scene in which there are a family user and a guest user near an information processing device 1 according to the embodiment.

FIG. 15 is an explanatory diagram illustrating a scene in which there are the family user and the guest user near the information processing device 1. In FIG. 15, there are the family user X and guest users P and Q near the information processing device 1. Further, the family user X and the guest users P and Q are staring at the information processing device 1. In the following description, FIG. 15 will be referred to as appropriate.

Figure 16:
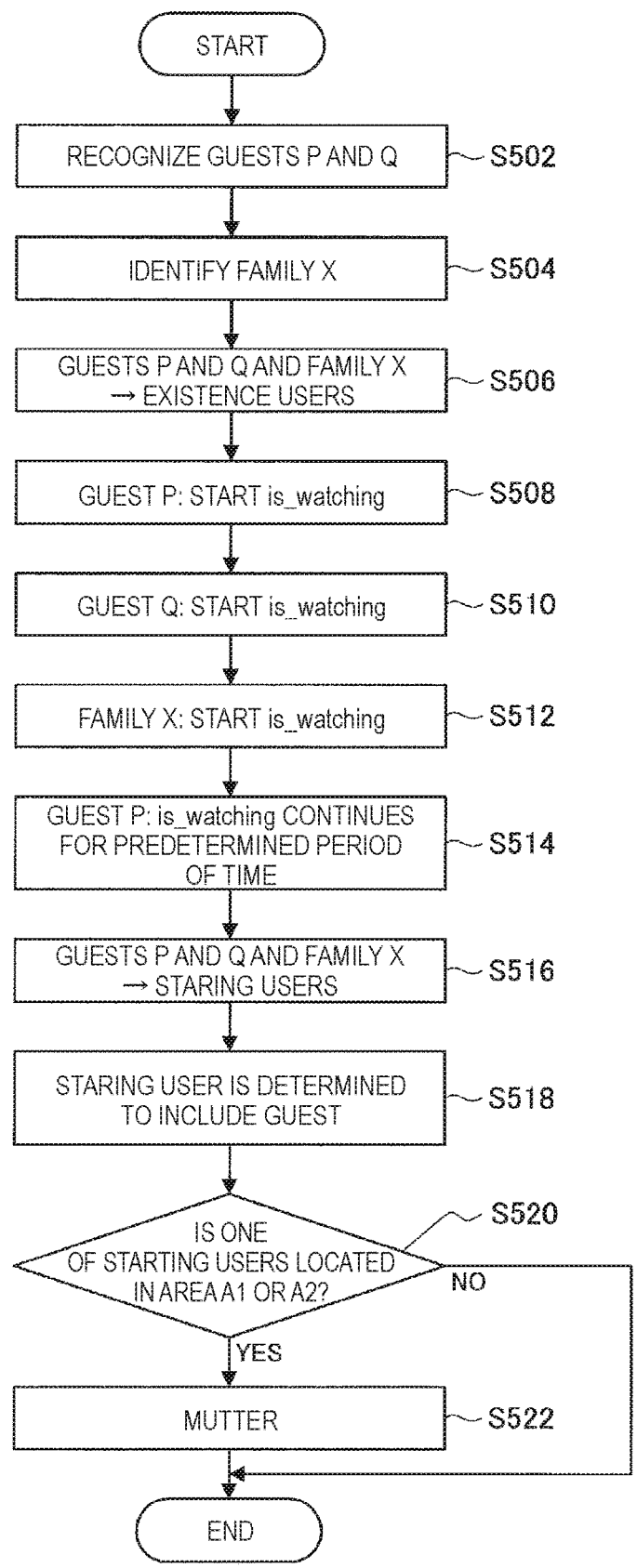
FIG. 16 is a flowchart illustrating an operation example of an information processing device 1 according to the embodiment in the scene illustrated in FIG. 15.

FIG. 16 is a flowchart illustrating the operation example of the information processing device 1 according to the present embodiment in the scene illustrated in FIG. 15. As illustrated in FIG. 16, the guest users P and Q are first recognized (S502). For example, the user recognizing unit 101 detects the users P and Q, and the user managing unit 103 specifies that the attribute of the users P and Q are the guest users. Further, each of the user recognizing unit 101 and the user managing unit 103 identifies the family user X (S504). Then, the user managing unit 103 classifies the types of the guest users P and Q and the family user X as the existence users (S506).

Here, the state becomes is_watching in the order of the guest users P and Q and the family user X (S508 to S512). Further, at a time point at which the state of the guest user P is determined to continue in the is_watching state for a predetermined period of time (for example, 2 seconds) (S514), the type of the guest users P and Q in the is_watching state and the family user X is classified as the staring users (S516).

Then, it is determined whether or not the guest user is included in the staring user, but in the present operation example, since the guest users P and Q are classified as the staring users, the guest user is determined to be included in the staring user (S518).

For example, as illustrated in FIG. 15, in a case in which any one of the staring users is located in the area A1 or the area A2 (YES in S520), the process proceeds to step S522. Further, since a process of step S522 is similar to the process of step S360, description thereof is omitted. On the other hand, in a case in which the staring user is not located in any of the area A1 and the area A2 (NO in S520), the process ends.

The operation example in the case in which there are the family user and the guest user near the information processing device 1 has been described above. As described above, in the case in which there is a guest user near the information processing device 1, the action (a muttering speech) not requesting the user response is decided as the action for the user, and thus it is possible to restrict the information processing device 1 from being manipulated by the user other than the family user.

4. MODIFIED EXAMPLES

An embodiment of the present disclosure has been described above. Several modified examples of an embodiment of the present disclosure will be described below. Further, each of the modified examples to be described below may be applied alone to the embodiment of the present disclosure or may be applied in combination to the embodiment of the present disclosure. Further, each modified example may be applied instead of the configuration described in the embodiment of the present disclosure or may be additionally applied to the configuration described in the embodiment of the present disclosure.

4-1. First Modified Example

In the above example, the action deciding unit 104 decides the action for the user on the basis of the distance from the user, but the present disclosure is not limited to this example. Another action decision example will be described below.

For example, the action for the user may be decided on the basis of a staring time of the user. For example, if the staring time is within a first period (for example, 1 second), an action for asking what to do may be decided if the staring time is larger than the first period and smaller than a second period (for example, three seconds), and an action for explaining how to use it may be decided if the staring time is larger than the second period and smaller than a third period (for example, 5 seconds).

Further, the action for the user may be decided on the basis of a speed at which the user approaches a main body. For example, if the speed at which the user approaches the main body is lower than a first speed (for example, 2 km/h), an action for asking what to do may be decided if the speed is higher than the first speed and lower than a second speed (for example 3 km/h). Further, if the speed at which the user approaches the main body is higher the second speed and lower than a third speed, the voice recognition may be started instantly without outputting the action

4-2. Second Modified Example

Further, in the above embodiment, the display or the speech asking what the user wants has been described as the example of the action requesting the user response, but the present disclosure is not limited to such an example. For example, the information processing device 1 may estimate what the user wants on the basis of information of the user and output display or speech related to checking of what is estimated to be done. For example, for the user who checks a schedule of a next day every day at a predetermined time, the information processing device 1 may estimate that what the user wants is next day schedule checking and display a message for checking if what to do is correct while displaying the next day schedule. According to such a configuration, a smoother interaction with the user is implemented.

4-3. Third Modified Example

Further, in the above embodiment, the example in which the action is output only to the target user has been described, but the present disclosure is not limited to such an example. For example, the information processing device 1 may output a speech such as "please wait a while until an interaction with a previous user is finished" for the user who is not the target user. Further, the information processing device 1 may not start the interaction for the user who is not the target user but perform an output indicating that it notices that the user has an interaction intention (for example, the light emitting unit 18 emits light in a direction of the user or the like).

4. HARDWARE CONFIGURATION EXAMPLE

The embodiments of the present disclosure have been described above. The information processing such as the processes such as the user recognition process, speech prediction process, the user management process, action decision process, the voice recognition process, the semantic analysis process, and the output control process is implemented in cooperation with software and the information processing devices 1 to 3. A hardware configuration example of an information processing device 1000 will be described as an example of a hardware configuration of the information processing devices 1 to 3 which are information processing devices according to the present embodiment.

Figure 17:
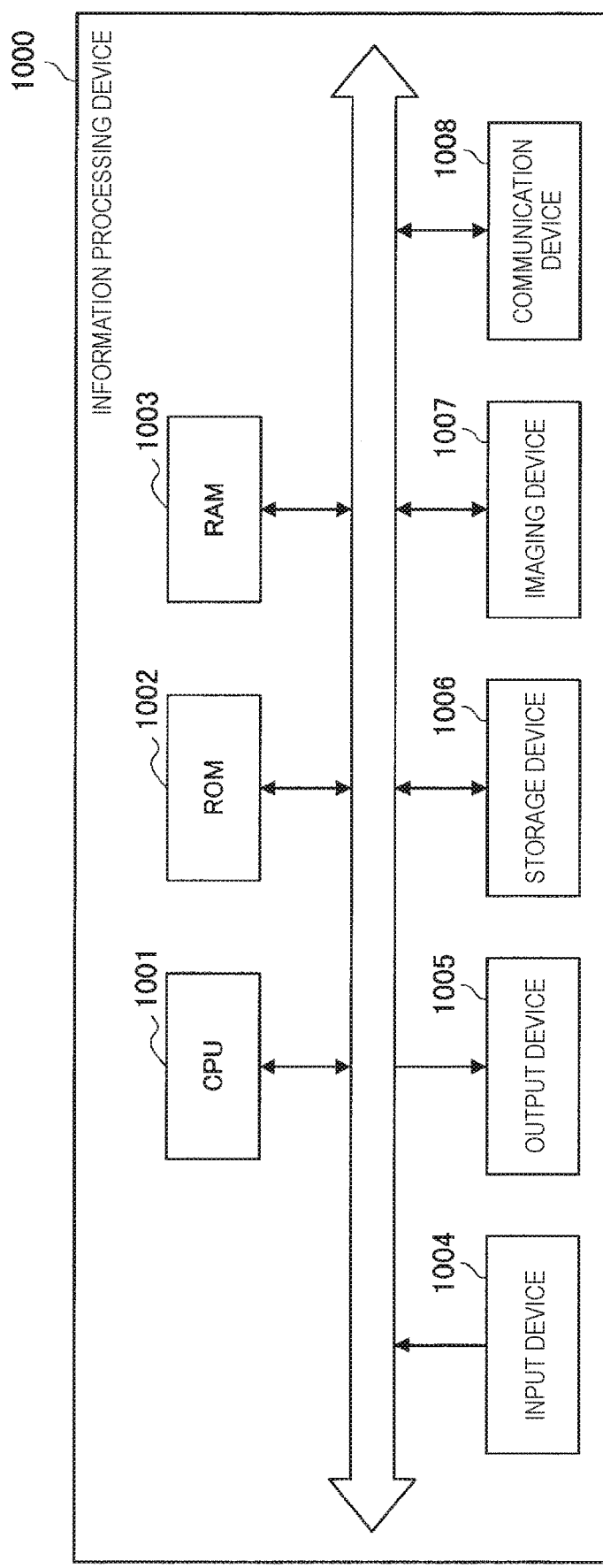
FIG. 17 is an explanatory diagram illustrating a hardware configuration example.

FIG. 17 is an explanatory diagram illustrating an example of a hardware configuration of the information processing device 1000. As illustrated in FIG. 11, the information processing device 1000 includes a central processing unit (CPU) 1001, a read only memory (ROM) 1002, a random access memory (RAM) 1003, an input device 1004, an output device 1005, a storage device 1006, an imaging device 1007, and a communication device 1008.

The CPU 1001 functions as an operation processing device and a control device and controls an overall operation of the information processing device 1000 in accordance with various kinds of programs. Further, the CPU 1001 may be a microprocessor. The ROM 1002 stores a program, an operation parameter, and the like which are used by the CPU 1001. The RAM 1003 temporarily stores a program to be used in the execution of the CPU 1001, a parameter that appropriately changes in the execution thereof, or the like. These components are connected to one another via a host bus including a CPU bus or the like. The functions of the control unit 10 are mainly implemented by cooperation of the CPU 1001, the ROM 1002, and the RAM 1003 and software.

The input device 1004 includes an input device for inputting information such as a mouse, a keyboard, a touch panel, a button, a microphone, a switch, a lever, or the like, an input control circuit for generating an input signal on the basis of an input by the user and outputting the input signal to the CPU 1001. By operating the input device 1004, the user of the information processing device 1000 can input various kinds of data to the information processing device 1000 or give an instruction to perform a processing operation.

The output device 1005 includes a display device such as, for example, a liquid crystal display (LCD) device, an OLED device, a see-through display, or a lamp. Further, the output device 1005 includes an audio output device such as a speaker and a headphone. For example, the display device displays a captured image, a generated image, or the like. On the other hand, the audio output device converts voice data or the like into a voice and outputs the voice. For example, the output device 1005 corresponds to the speaker 13, projecting unit 16, and the light emitting unit 18 described above with reference to FIG. 2.

The storage device 1006 is a device for storing data. The storage device 1006 may include a storage medium, a recording device for recording data in a storage medium, a reading device for reading data from a storage medium, a deleting device for deleting data recorded in a storage medium, and the like. The storage device 1006 stores a program executed by the CPU 1001 and various kinds of data. The storage device 1006 corresponds to the storage unit 17 described above with reference to FIG. 2.

The imaging device 1007 includes an imaging optical system such as a photographing lens for collecting light and a zoom lens and a signal converting element such as a charge coupled device (CCD) or a complementary metal oxide semiconductor (CMOS). The imaging optical system collects light emitted from a subject and forms a subject image in a signal converting unit, and the signal converting element converts the formed subject image into an electric image signal. The imaging device 1007 corresponds to the camera 14 described above with reference to FIG. 2.

The communication device 1008 is, for example, a communication interface constituted by a communication device or the like for establishing a connecting with a communication network. Further, the communication device 1008 may include a communication device compatible with a wireless local area network (LAN), a communication device compatible with long term evolution (LTE), a wire communication device performing wired communication, or a Bluetooth (registered trademark) communication device. The communication device 1008 corresponds to the communication unit 11 described above with reference to FIG. 2, for example.

6. CONCLUSION

As described above, according to the present disclosure, it is possible to output the actions according to the intention of the user by deciding the action on the basis of the distance from the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, respective steps in the above embodiments need not be necessarily processed chronologically in accordance with the order described as the flowchart diagram. For example, respective steps in the processes of the above embodiments may be processed in an order different from the order described as the flowchart diagram or may be processed in parallel.

Further, in the above embodiment, the example in which the distance from the user is the distance between the information processing device and the user has been described, but the present disclosure is not limited to such an example. For example, in a case in which the information processing device controls the output of another terminal having a speaker or a display unit, the distance from the user may be a distance between another terminal and the user.

Further, according to the above embodiments, it is also possible to provide a computer program causing hardware such as the CPU 1001, the ROM 1002, and the RAM 1003 to perform the functions similar to those of the information processing device 1 described above. Further, a recording medium having the computer program recorded therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
an action deciding unit configured to decide an action for a user on a basis of a distance from the user; and
an output control unit configured to output the action.

(2)
The information processing device according to (1), in which the distance from the user is a distance between the information processing device and the user.

(3)
The information processing device according to (1) or (2), further including:
a user managing unit configured to specify a target user serving as a target of the action.

(4)
The information processing device according to (3), in which the user managing unit specifies the target user on a basis of a state of the user.

(5)
The information processing device according to (4), in which the user managing unit specifies the target user further on a basis of the distance from the user or a duration of the state of the user.

(6)
The information processing device according to any of (3) to (5), in which the user managing unit classifies the users into a plurality of types on a basis of a state of the user, and the action deciding unit decides the action for the user further on a basis of a classified type of the user.

(7)
The information processing device according to (6), in which the action deciding unit decides the action in accordance with the distance from the user having the smallest distance from the user among the users classified into a predetermined type.

(8)
The information processing device according to (7), in which the user managing unit specifies the target user on a basis of the user classified into the predetermined type.

(9)
The information processing device according to any one of (3) to (8), in which the user managing unit specifies the user whose speech is predicted as the target user in a case in which the speech of the user is predicted.

(10)
The information processing device according to (9), in which the action deciding unit decides an action requesting a response of the user as the action for the user in the case in which the speech of the user is predicted.

(11)
The information processing device according to any one of (1) to (10), in which the action deciding unit decides the action further on a basis of attribute information of the user.

(12)
The information processing device according to (11), in which the action deciding unit decides an action not requiring a response of the user as the action for the user in a case in which there is a user having a predetermined attribute.

(13)
The information processing device according to any one of (1) to (12), further including:
a voice recognition unit configured to start voice recognition in accordance with the action decided by the action deciding unit.

(14)
The information processing device according to any one of (1) to (13), in which the action deciding unit decides an action requesting a response of the user as the action for the user in a case in which the distance from the user is a first distance or less.

(15)
The information processing device according to (14), in which the action deciding unit decides an action not requiring the response of the user as the action for the user in a case in which the distance from the user is larger than the first distance.

(16)
The information processing device according to (15), in which the action deciding unit decides display not requesting the response of the user as the action for the user in a case in which the distance from the user is a second distance or less.

(17)
The information processing device according to (16), in which the action deciding unit decides speech not requesting the response of the user as the action for the user in a case in which the distance from the user is larger than the second distance and a third distance or less.

(18)
An information processing method including:
deciding, by a processor, an action for a user on a basis of a distance from the user; and
outputting the action.

(19)
A program causing a computer to implement:
a function of deciding an action for a user on a basis of a distance from the user; and
a function of outputting the action.

REFERENCE SIGNS LIST

1 information processing device
10 control unit
11 communication unit
12 sound collecting unit
13 speaker
14 camera
15 range sensor
16 projecting unit
17 storage unit
18 light emitting unit 101 user recognizing unit
102 speech predicting unit
103 user managing unit
104 action deciding unit
105 voice recognizing unit
106 semantic analyzing unit
107 output control unit

The invention claimed is:

1. An information processing device, comprising:
circuitry configured to:
determine speech of a first user of a plurality of users based on an approaching speed of the first user toward the information processing device, wherein
the speech indicates intention of the first user to interact with the information processing device, and
the approaching speed of the first user is one of equal to or greater than a threshold value;
specify the first user from the plurality of users as a target user based on the determined speech;
select a first action of a plurality of actions for the first user based on the determined speech of the first user;
output the first action to the first user;
store output information of the first action, wherein the output information indicates a time at which the first action is output to the first user;
specify a second user, of the plurality of users, other than the first user as the target user in a case where a second action is output to the first user within a specific time period of the output of the first action to the first user, wherein the second action and the first action are same; and
output the second action to the second user.

2. The information processing device according to claim 1, wherein the circuitry is further configured to specify the first user as the target user based on a state of the first user.

3. The information processing device according to claim 2, wherein the circuitry is further configured to specify the first user as the target user based on a time duration associated with the state of the first user.

4. The information processing device according to claim 1, wherein the circuitry is further configured to
classify, the plurality of users into a plurality of types based on a state of each user of the plurality of users, wherein the first user is associated with a specific type of the plurality of types.

5. The information processing device according to claim 4, wherein the circuitry is further configured to specify the first user as the target user based on a distance of the first user that is a smallest distance from the information processing device among the plurality of users.

6. The information processing device according to claim 1, wherein the first action requests a response of the first user.

7. The information processing device according to claim 1, wherein the circuitry is further configured to select the first action based on attribute information of the first user.

8. The information processing device according to claim 7, wherein
the attribute information includes at least one attribute associated with the first user,
the circuitry is further configured to select the first action based on a specific attribute of the at least one attribute associated with the first user, and
a response of the first user is not required based on the first action.

9. The information processing device according to claim 1, wherein the circuitry is further configured to start voice recognition based on the first action.

10. The information processing device according to claim 5, wherein
the circuitry is further configured to select the first action based on the distance of the first user that is one of equal to or less than a first distance, and
the first action requests a response of the first user.

11. The information processing device according to claim 5, wherein
the circuitry is further configured to select the first action based on the distance of the first user that is larger than a first distance, and
a response of the first user is not required based on the first action.

12. The information processing device according to claim 11, wherein
the circuitry is further configured to control a projecting unit to display a message as the first action for the first user based on the distance of the first user that is one of less than or equal to a second distance, and
the response of the first user is not required based on the first action.

13. The information processing device according to claim 12, wherein
the circuitry is further configured to output speech as the first action for the first user based on the distance of the first user that is larger than the second distance and one of less than or equal to a third distance, and
the response of the first user is not required based on the first action.

14. An information processing method, comprising:
in an information processing device:
determining, by a processor of the information processing device, speech of a first user of a plurality of users based on an approaching speed of the first user toward the information processing device, wherein
the speech indicates intention of the first user to interact with the information processing device, and
the approaching speed of the first user is one of equal to or greater than a threshold value;
specifying the first user from the plurality of users as a target user based on the determined speech;
selecting, by the processor, a first action of a plurality of actions for the first user based on the determined speech of the first user;
outputting the first action to the first user;
storing output information of the first action, wherein the output information indicates a time at which the first action is output to the first user;
specifying a second user, of the plurality of users, other than the first user as the target user in a case where a second action is output to the first user within a specific time period of the output of the first action to the first user, wherein the second action and the first action are same; and
outputting the second action to the second user.

15. A non-transitory computer-readable medium having stored thereon, computer executable-instructions that, when executed by a processor, cause the processor to execute operations, the operations comprising:
determining speech of a first user of a plurality of users based on an approaching speed of the first user toward an information processing device, wherein
the speech indicates intention of the first user to interact with the information processing device, and the approaching speed of the first user is one of equal to or greater than a threshold value;

specifying the first user from the plurality of users as a target user based on the determined speech;

selecting a first action of a plurality of actions for the first user based on the determined speech of the first user; and outputting the first action to the first user;

storing output information of the first action, wherein the output information indicates a time at which the first action is output to the first user;

specifying a second user, of the plurality of users, other than the first user as the target user in a case where a second action is output to the first user within a specific time period of the output of the first action to the first user, wherein the second action and the first action are same; and outputting the second action to the second user.

* * * * *